(12) United States Patent
Hasuo

(10) Patent No.: US 10,693,142 B2
(45) Date of Patent: Jun. 23, 2020

(54) ALUMINUM NONWOVEN FIBER MATERIAL FOR CURRENT COLLECTOR OF ELECTRIC POWER STORAGE EQUIPMENT, MANUFACTURING METHOD THEREOF, ELECTRODE UTILIZING ALUMINUM NONWOVEN FIBER MATERIAL AND MANUFACTURING METHOD THEREOF

(71) Applicant: I & T New Materials Co., Ltd., Yanagawa (JP)

(72) Inventor: Shunji Hasuo, Yanagawa (JP)

(73) Assignee: I & T New Materials Co., Ltd., Yanagawa (JP)

( * ) Notice: Subject to any disclaimer, the term of this patent is extended or adjusted under 35 U.S.C. 154(b) by 64 days.

(21) Appl. No.: 15/769,350

(22) PCT Filed: Jul. 13, 2016

(86) PCT No.: PCT/JP2016/070752
§ 371 (c)(1),
(2) Date: Apr. 19, 2018

(87) PCT Pub. No.: WO2017/068820
PCT Pub. Date: Apr. 27, 2017

(65) Prior Publication Data
US 2018/0316019 A1 Nov. 1, 2018

(30) Foreign Application Priority Data
Oct. 20, 2015 (JP) .................................. 2015-206617

(51) Int. Cl.
*H01M 4/70* (2006.01)
*H01M 4/66* (2006.01)
(Continued)

(52) U.S. Cl.
CPC ............ *H01M 4/70* (2013.01); *D04H 1/4234* (2013.01); *D04H 1/44* (2013.01); *D04H 1/724* (2013.01);
(Continued)

(58) Field of Classification Search
CPC combination set(s) only.
See application file for complete search history.

(56) References Cited

U.S. PATENT DOCUMENTS 5,300,165 A * 4/1994 Sugikawa ............. B22F 3/1118
156/150
6,197,251 B1 * 3/2001 Hashimoto ............ B22F 1/004
29/2
(Continued)

FOREIGN PATENT DOCUMENTS

JP S62294104 A 12/1987
JP 06196170 A 7/1994
(Continued)

OTHER PUBLICATIONS

Extended European Search Report for EP patent application No. 16857138.8, dated Jun. 26, 2019.

*Primary Examiner* — Christopher P Domone
(74) *Attorney, Agent, or Firm* — Gang Yu

(57) ABSTRACT

A manufacturing method for an aluminum nonwoven fiber material includes: a block forming procedure where molten aluminum is extruded into a space through micropores (42*a*) and, moreover, aluminum fibers formed by extrusion are maked fall on a predetermined support surface (43), thereby forming an aluminum fiber block on the support surface (43); a short fiber removing procedure in which removing treatment on aluminum short fibers shorter than a predetermined length from the aluminum fiber block is performed; and a pressurization procedure in which the aluminum fiber
(Continued)

block subjected to the short fiber removing procedure is pressurized to form the aluminum nonwoven fiber material.

11 Claims, 14 Drawing Sheets

(51) Int. Cl.

| | |
|---|---|
| D04H 1/4234 | (2012.01) |
| D04H 1/724 | (2012.01) |
| H01G 11/68 | (2013.01) |
| H01G 11/84 | (2013.01) |
| H01G 11/86 | (2013.01) |
| H01G 11/40 | (2013.01) |
| H01M 4/04 | (2006.01) |
| H01M 4/80 | (2006.01) |
| H01M 4/74 | (2006.01) |
| D04H 1/44 | (2006.01) |
| H01M 4/13 | (2010.01) |

(52) U.S. Cl.
CPC .............. *H01G 11/40* (2013.01); *H01G 11/68* (2013.01); *H01G 11/84* (2013.01); *H01G 11/86* (2013.01); *H01M 4/04* (2013.01); *H01M 4/13* (2013.01); *H01M 4/66* (2013.01); *H01M 4/666* (2013.01); *H01M 4/667* (2013.01); *H01M 4/74* (2013.01); *H01M 4/80* (2013.01); *Y02E 60/13* (2013.01)

(56) References Cited

U.S. PATENT DOCUMENTS

| | | | |
|---|---|---|---|
| 2004/0231124 A1* | 11/2004 | Morimoto | B22D 11/005 29/419.1 |
| 2012/0088139 A1 | 4/2012 | Sakai et al. | |
| 2013/0244110 A1 | 9/2013 | Miyoshi et al. | |
| 2014/0030605 A1* | 1/2014 | Kim | H01M 4/62 429/235 |
| 2018/0090762 A1* | 3/2018 | Mizuno | H01M 4/36 |

FOREIGN PATENT DOCUMENTS

| | | |
|---|---|---|
| JP | 2009224623 A | 10/2009 |
| JP | 2012089303 A | 5/2012 |
| JP | 2014510386 A | 4/2014 |
| KR | 100540819 B1 | 1/2006 |
| KR | 20120114117 A | 10/2012 |
| WO | 2003008690 A1 | 1/2003 |

* cited by examiner

ALUMINUM NONWOVEN FIBER MATERIAL FOR CURRENT COLLECTOR OF ELECTRIC POWER STORAGE EQUIPMENT, MANUFACTURING METHOD THEREOF, ELECTRODE UTILIZING ALUMINUM NONWOVEN FIBER MATERIAL AND MANUFACTURING METHOD THEREOF

TECHNICAL FIELD

The disclosure relates to an aluminum nonwoven fiber material for a current collector of electric power storage equipment such as a secondary battery and a capacitor, a manufacturing method thereof, an electrode utilizing the aluminum nonwoven fiber material and a manufacturing method thereof.

BACKGROUND

For the objectives of saving energy and preventing global warming, capacitors or secondary batteries are used in various fields, particularly in the automobile industry. Due to adoption of electric energy, development of technologies utilizing these is being accelerated.

At present, a double electric layer capacitor is used as a backup of a memory of a circuit applying a low voltage, and compared with a secondary battery, has relatively higher input and output reliability.

Therefore, in recent years, double electric layer capacitors are used for natural-energy-based power generation such as photovoltaic or wind power generation or construction machinery and voltage sag power supplies, renewable power supplies of trolleys, and the like, Uses for automobiles are also researched. Characteristics and cost do not meet requirements yet, and up to now, uses in this field have yet not been realized. However, at present, double electric layer capacitors are used for electronic control brake systems, and researches on uses for starting energy supply, brake control, power assisting and the like of standby power supplies of electrical components and idling stop systems of automobiles are being made.

A double electric layer capacitor is structurally formed by positive and negative electrode parts, an electrolyte solution and a partition plate for preventing short-circuit of the opposite positive and negative electrode parts. Polarizable electrodes (mainly activated carbon at present), a binder for retaining the active carbon and a conductive agent (mainly carbon microparticles or fine fibers) are mixed and kneaded for coating on an aluminum foil (with a thickness of about 20 μm) which is taken as a current collector, and multiple layers are formed by coating, thereby forming the electrode parts. For example, such a double electric layer capacitor is disclosed in Patent Document 1.

Electrolyte ions move in a solution, and are adsorbed or desorbed on surfaces of micropores of the activated carbon, thereby charging the double electric layer capacitor. Double electric layers are formed on a contact interface of activated carbon powder and the electrolyte solution.

Here, the activated carbon usually has a particle size of, for example, about 4~8 μm and a specific surface area of, for example, 1,600~2,500 m$^3$/g. The electrolyte solution contains cations, anions and a solvent, tetraethylammonium salt is used as the cations, tetrafluoroboric acid ions are used as the anions, and propylene carbonate, ethylene carbonate or the like is used as the solvent.

On the other aspect, a lithium ion secondary battery is mainly formed by a positive electrode, an negative electrode and a partition plate. For example, as shown in FIG. 8, under a normal condition, the positive electrode is formed by coating a 20 μm-thick aluminum foil taken as a current collector with a 100 μm-thick substance obtained by blending active substance powder (usually lithium cobaltate), a conductive agent taken as an additive and a binder, the negative electrode is formed by coating a copper foil taken as a current collector with a carbon material, and these are partitioned by the partition plate such as polyethylene and soaked in an electrolyte solution, thereby forming the lithium ion secondary battery. Such a lithium ion secondary battery is disclosed in Patent Document 2.

Charging and discharging are implemented by movement of lithium ions between the positive electrode and the negative electrode. During charging, the lithium ions move from the positive electrode to the negative electrode, and when the lithium ions of the positive electrode disappear or no lithium ions may be stored in the negative electrode anymore, charging is ended. Discharging is reverse to charging.

PRIOR TECHNICAL DOCUMENTS

Patent Documents

Patent document 1: Japanese patent application disclosure gazette 1005-086113

Patent document 2: Japanese patent application disclosure gazette 2007-123156

SUMMARY

In recent years, capacitors for power devices for electric vehicles, energy-based power generation and the like have been developed. For efficiently outputting high-capacity energy from a capacitor or input high-capacity energy into the capacitor, a method of increasing electrostatic capacitance and reducing resistance in an electrode part may be adopted. Briefly, a method of shortening a distance between activated carbon and an aluminum component taken as a current collector and arranging the activated carbon as much as possible may be adopted.

Under a normal condition, a difference between a double electric layer capacitor and a secondary battery, mainly a lithium ion secondary battery, is that there may occur no chemical reaction, and because of self-discharging, charges are lost along with time, an electric power storage time is relatively short, and a current discharging time is short. Moreover, in terms of energy density, a lithium battery reaches hundreds of Wh/L, while a double electric layer capacitor is dozens of Wh/L. Based on this difference, uses of double electric layer capacitors for starting energy, brake control, power assisting and the like of standby power supplies of electrical components or idling stop systems, rather than electric power storage, are being made.

Secondary batteries, mainly lithium batteries, have relatively high energy densities, may be used for long, are thus applied to various fields led by portable equipment, and have been applied to the fields of automobiles or heavy equipment, energy resources and the like in recent years. However, there may still exist many problems about performance (capacitance, charging/discharging speed and service life) and manufacturing cost, and particularly in large-sized batteries of automobiles and the like, the problems are more significant. For example, a current used in a portable phone is several mA, but a current used in a hybrid vehicle is hundreds of A, and a difference therebetween is 10,000 times or more. Therefore, it is necessary to implement enlargement for capacitance increase, but there may exist many problems about a charging speed, reliability, manufacturing difficulties and the like including capacitance during enlargement.

Reaction of a lithium ion secondary battery is reversible chemical reaction, and when electrodes are charged/discharged, a volume of active substance is expanded or shrunk. Therefore, separation of the active substance from a current collector may deteriorate charging/discharging characteristics. That is, charging/discharging may not always be 100% completely the same, and a charging/discharging capability is reduced. In a hybrid vehicle or an electric vehicle, a battery is used for several years, and thus, for preventing such deterioration, it is necessary to inhibit separation of the current collector from the active substance.

Moreover, the biggest problem of a lithium ion battery is internal resistance. Internal resistance may refer to resistance during movement of lithium ions in a dielectric medium between a positive electrode and negative electrode in the battery, and the movement resistance is a major cause why capacitance may not be increased or why a charging/discharging speed may not be increased.

When a current collector is coated with a large amount of active substance for enlargement, capacitance may be increased, but movement resistance is increased. Thus, its thickness is limited at present. Moreover, a charging/discharging speed is reduced by its resistance. If a coating thickness is reduced, the internal resistance is reduced and the charging/discharging speed is increased, but the capacitance is reduced. For this reason, it is necessary to laminate multiple layers of current collectors coated with the active substance or enlarge an area of the current collector coated with the active substance.

The charging/discharging speed is also related to generation of the lithium ions. If many ions may be generated and move at one time, the charging speed and the discharging speed are increased. The chemical reaction of the secondary battery occurs on an interface with an electrolyte, so, if a contact area of electrodes and the electrolyte may be enlarged, the charging/discharging speed may be improved.

For reducing the internal resistance, an additive, a conductive agent or the active substance is tried to be improved, and the current collector is coated with carbon microparticles and the like in advance. In addition, in terms of a shape of the current collector, as mentioned above, improvement of formation into a thin film or improvement of formation of fine pores and the like in a foil for enlargement of a surface area is made. Moreover, researches and development of improving the activated carbon or the additive, enlarging the contact area with the current collector and the like in a double electric layer capacitor are also made.

As mentioned above, in a double electric layer capacitor or secondary battery such as a lithium ion secondary battery used as electric power storage equipment, high capacity, high output, prolonging of service life and reduction in cost are tried to be implemented for use for an electric vehicle, a hybrid vehicle and a high-power energy device.

In view of this, the disclosure is provided and intended to provide an aluminum nonwoven fiber material capable with increasing a charging/discharging speed of electric power storage equipment for a current collector of the electric power storage equipment, a manufacturing method thereof, an electrode utilizing the aluminum nonwoven fiber material and a manufacturing method thereof.

For solving the technical problem, the disclosure adopts the following means.

A manufacturing method for an aluminum nonwoven fiber material for a current collector of electric power storage equipment according to a first aspect of the disclosure includes: a block forming procedure in which molten aluminum is extruded into a space through micropores and, moreover, aluminum fibers formed by extrusion are made fall on a predetermined support surface, thereby forming an aluminum fiber block on the support surface; a short fiber removing procedure in which removing treatment on aluminum short fibers shorter than a predetermined length from the aluminum fiber block is performed; and a pressurization procedure in which the aluminum fiber block subjected to the short fiber removing procedure is pressurized to form the aluminum nonwoven fiber material.

A manufacturing method for an aluminum nonwoven fiber material for a current collector of electric power storage equipment according to a second aspect of the disclosure includes: a block forming procedure in which molten aluminum is extruded into a space through micropores and, moreover, aluminum fibers formed by extrusion are made fall on a predetermined support surface, thereby forming an aluminum fiber block on the support surface; and a short fiber removing procedure in which removing treatment on aluminum short fibers shorter than a predetermined length from the aluminum fiber block is performed, thereby treating the aluminum fiber block into the aluminum nonwoven fiber material for the current collector.

According to the first aspect and the second aspect, the aluminum short fibers shorter than the predetermined length are removed from the aluminum fiber block, so that a ratio of long fibers in the aluminum nonwoven fiber material is increased. Therefore, when electrons are exchanged between adsorbent powder or active substance powder and each aluminum fiber, resistance of movement of the electrons thereof to input/output terminals arranged at ends and the like of the aluminum nonwoven fiber material may be reduced.

A wire diameter of each aluminum fiber is relatively small, so that the movement resistance of the electrons in contact parts between the aluminum fibers is increased by a contact state. However, according to the first aspect and the second aspect, the ratio of the long fibers is increased, and correspondingly, a number of the aluminum fibers incapable of transferring the electrons to the input/output terminals without the other aluminum fibers is reduced.

In short fiber removing treatment of the first or second aspect, vibration may be applied to the aluminum fiber block to remove the aluminum short fibers.

Under such a condition, the short fibers may be effectively removed from the intricately interwoven aluminum fiber block.

In the block forming procedure of the first or second aspect, a force in an extrusion direction of the aluminum fibers may also be applied to the aluminum fibers formed by extrusion through an air blower or a force application mechanism before they fall on the predetermined support surface.

Therefore, the aluminum may pass through the micropores 42a with a relatively small diameter more smoothly, which is favorable for effectively manufacturing long fibers with a relatively small average wire diameter.

Moreover, in the first or second aspect, a pressure reduction procedure in which the space is turned into negative pressure may further be performed before the block forming procedure.

Therefore, the aluminum may pass through the micropores 42*a* with the relatively small diameter more smoothly, which is favorable for effectively manufacturing the long fibers with the relatively small average line diameter.

Moreover, in the block forming procedure of the first or second aspect, the aluminum may further be extruded downwards to form the aluminum fibers through the micropores, and moreover, the formed aluminum fibers are made fall on the support surface in a state of simultaneously moving the support surface towards a predetermined conveying direction and applying vibration in a direction orthogonal to the conveying direction to the support surface, thereby forming the aluminum fiber block on the support surface.

Therefore, a number of contacts between adjacent aluminum fibers is increased, which is favorable for reducing the movement resistance of the electrons between the active substance powder or the adsorbent powder and the input/output terminals.

The aluminum nonwoven fiber material for the current collector of the electric power storage equipment according to a third aspect of the disclosure is an aluminum nonwoven fiber material of which an average wire diameter of the aluminum fibers is smaller than 100 μm, and an average value of numbers of ends of the aluminum fibers appearing on one surface and the other surface in a thickness direction of the aluminum nonwoven fiber material is smaller than 5 per square centimeter.

According to the third aspect, the numbers of the ends of the aluminum fibers appearing on one surface and the other surface in the thickness direction are relatively small, and correspondingly, the ratio of the long fibers in the aluminum nonwoven fiber material is increased. Therefore, when the electrons are exchanged between the adsorbent powder or the active substance powder and each aluminum fiber, the resistance of movement of the electrons thereof to the input/output terminals arranged at the ends and the like of the aluminum nonwoven fiber material may be reduced.

In the third aspect, each aluminum fiber may further be formed to have a sectional shape with more than three convexly-shaped parts and more than three concavely-shaped parts, wherein the convexly-shaped parts have inner angles of smaller than 180°, and the concavely-shaped parts are arranged between every two convexly-shaped parts respectively, and have inner angles of larger than 180°.

Under such a condition, when the adsorbent powder or the active substance powder is arranged in the concavely-shaped parts of each aluminum fiber, it is difficult for the adsorbent powder or the active substance powder to move relative to each aluminum fiber in the aluminum nonwoven fiber material, which is favorable for keeping contact between the adsorbent powder or the active substance powder and each aluminum fiber for a long time.

A manufacturing method for an electrode of electric power storage equipment according to a fourth aspect of the disclosure includes: a slurry manufacturing procedure in which liquiform or gelatinous slurry containing adsorbent powder adsorbed by electrolyte ions during charging or active substance powder which undergoes chemical reaction during charging/discharging and a binder is manufactured; a import procedure in which the slurry is imported into an aluminum nonwoven fiber material manufactured by the foregoing manufacturing method; and a drying procedure in which the slurry attached to the aluminum nonwoven fiber material after the import procedure is dried.

For example, for a capacitor, the method includes: a slurry manufacturing procedure in which liquiform or gelatinous slurry containing adsorbent powder, a binder, a conductive agent and the like is manufactured; a import procedure in which the slurry is imported into the aluminum nonwoven fiber material manufactured by the foregoing manufacturing method; and a drying procedure in which the slurry attached to the aluminum nonwoven fiber material after the import procedure is dried. Moreover, for a lithium ion secondary battery, like the capacitor, the method includes: a slurry manufacturing procedure in which liquiform or gelatinous slurry containing an active substance (titanium oxide and the like), a binder, a conductive agent and the like is manufactured; a import procedure in which the slurry is imported into the aluminum nonwoven fiber material manufactured by the foregoing manufacturing method; and a drying procedure in which the slurry attached to the aluminum nonwoven fiber material after the import procedure is dried.

According to the fourth aspect, similar to the abovementioned aspects, a ratio of long fibers in the aluminum nonwoven fiber material is increased. Therefore, the slurry is dried to enable much adsorbent powder or active substance powder to contact with each aluminum fiber of the aluminum nonwoven fiber material, and when electrons are exchanged between the adsorbent powder or the active substance powder and each aluminum fiber, resistance of movement of the electrons thereof to input/output terminals arranged at ends and the like of the aluminum nonwoven fiber material may be reduced.

In the fourth aspect, before the drying procedure, multiple aluminum nonwoven fiber materials into which the slurry is imported may further be laminated, and in a laminated state, the slurry imported into each aluminum nonwoven fiber material is dried, thereby manufacturing the electrode.

By such treatment, each aluminum nonwoven fiber material which is formed is relatively thin, so that the slurry may be simply and accurately imported into each aluminum nonwoven fiber material.

In the fourth aspect, after the import procedure or the drying procedure, a pressurization procedure in which the aluminum nonwoven fiber material is pressurized may further be performed.

Under such a condition, by pressurization, gaps between the aluminum fibers in the aluminum nonwoven fiber material may be reduced. Therefore, the adsorbent powder or active substance powder imported into the aluminum nonwoven fiber material is unlikely to move from an interior to exterior of the aluminum nonwoven fiber material, which is favorable for keeping contact between the adsorbent powder or the active substance powder and each aluminum fiber for a long time.

In the fourth aspect, in the slurry manufacturing procedure, the slurry containing the adsorbent powder or the active substance powder, the binder and Carbon Fibers (CFs) with an average thickness of smaller than 0.5 μm may be manufactured.

By such treatment, for example, even when the adsorbent powder does not directly contact with the aluminum fibers, the adsorbent powder is electrically connected with the aluminum fibers through the CFs. Moreover, even when the adsorbent powder directly contacts with the aluminum fibers, due to existence of connections through the CFs, resistance between the adsorbent powder and the aluminum fibers is further reduced.

An electrode for electric power storage equipment according to a fifth aspect of the disclosure contains: an aluminum nonwoven fiber material; and adsorbent powder adsorbed by electrolyte ions during charging or active substance powder which undergoes chemical reaction during charging, which is retained in the aluminum nonwoven fiber material by a binder.

According to the fifth aspect, similar to the abovementioned aspects, a ratio of long fibers in the aluminum nonwoven fiber material is increased. Therefore, most of the adsorbent powder or active substance powder retained by the binder contacts with each aluminum fiber of the aluminum nonwoven fiber material, and when electrons are exchanged between the adsorbent powder or the active substance powder and each aluminum fiber, resistance of movement of the electrons thereof to input/output terminals arranged at ends and the like of the aluminum nonwoven fiber material may be reduced.

In the fifth aspect, the aluminum nonwoven fiber material has at least one part where two aluminum fibers contact crosswise to form a structure that the aluminum nonwoven fiber material is pressurized to mutually sink the two aluminum fibers in the cross part.

Under such a condition, the movement resistance of the electrons in contact parts between the aluminum fibers may be reduced, which is favorable for reducing the resistance of movement of the electrons to the input/output terminals.

In the fifth aspect, there are also CFs retained in the aluminum nonwoven fiber material to reduce the resistance between the adsorbent powder or the active substance powder and the aluminum nonwoven fiber material.

In case of such a structure, the resistance between the adsorbent powder or the active substance powder and the aluminum fibers may be reduced, which is favorable for reducing the resistance of movement of the electrons to the input/output terminals.

In the fifth aspect, an electrode laminated with multiple layers of such aluminum nonwoven fiber materials in which the adsorbent powder or the active substance powder is retained respectively may be formed.

In case of such a structure, each aluminum nonwoven fiber material which is formed may be relatively thin, and slurry may be simply and accurately imported into each aluminum nonwoven fiber material.

Technical Effect

According to the disclosure, a charging/discharging speed of the electric power storage equipment may be increased.

DETAILED DESCRIPTION OF THE EMBODIMENTS

An electrode involved in a first embodiment of the disclosure will be described below with reference to the drawings.

Figure 6:
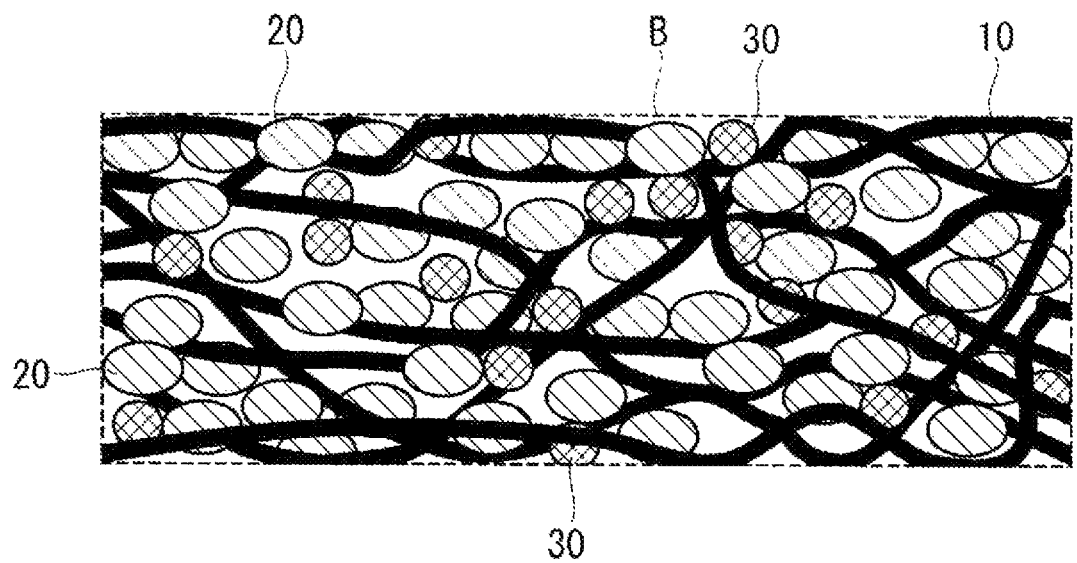
FIG. 6 is a sectional image diagram of an electrode involved in a first embodiment of the disclosure.

As shown in FIG. 6, the electrode contains an aluminum nonwoven fiber material 10 of which an average wire diameter of aluminum fibers is smaller than 100 μm and active substance powder 20 which is retained in the aluminum nonwoven fiber material 10 by a binder B and undergoes chemical reaction during charging/discharging, and according to a requirement, contains a conductive agent 30 which is retained in the aluminum nonwoven fiber material 10 by the binder B. In FIG. 6, adsorbent powder adsorbed by electrolyte ions during charging may be retained in the aluminum nonwoven fiber material 10 to replace the active substance powder 20.

[Formation of an Aluminum Nonwoven Fiber Material Used as a Current Collector]

Figure 1:
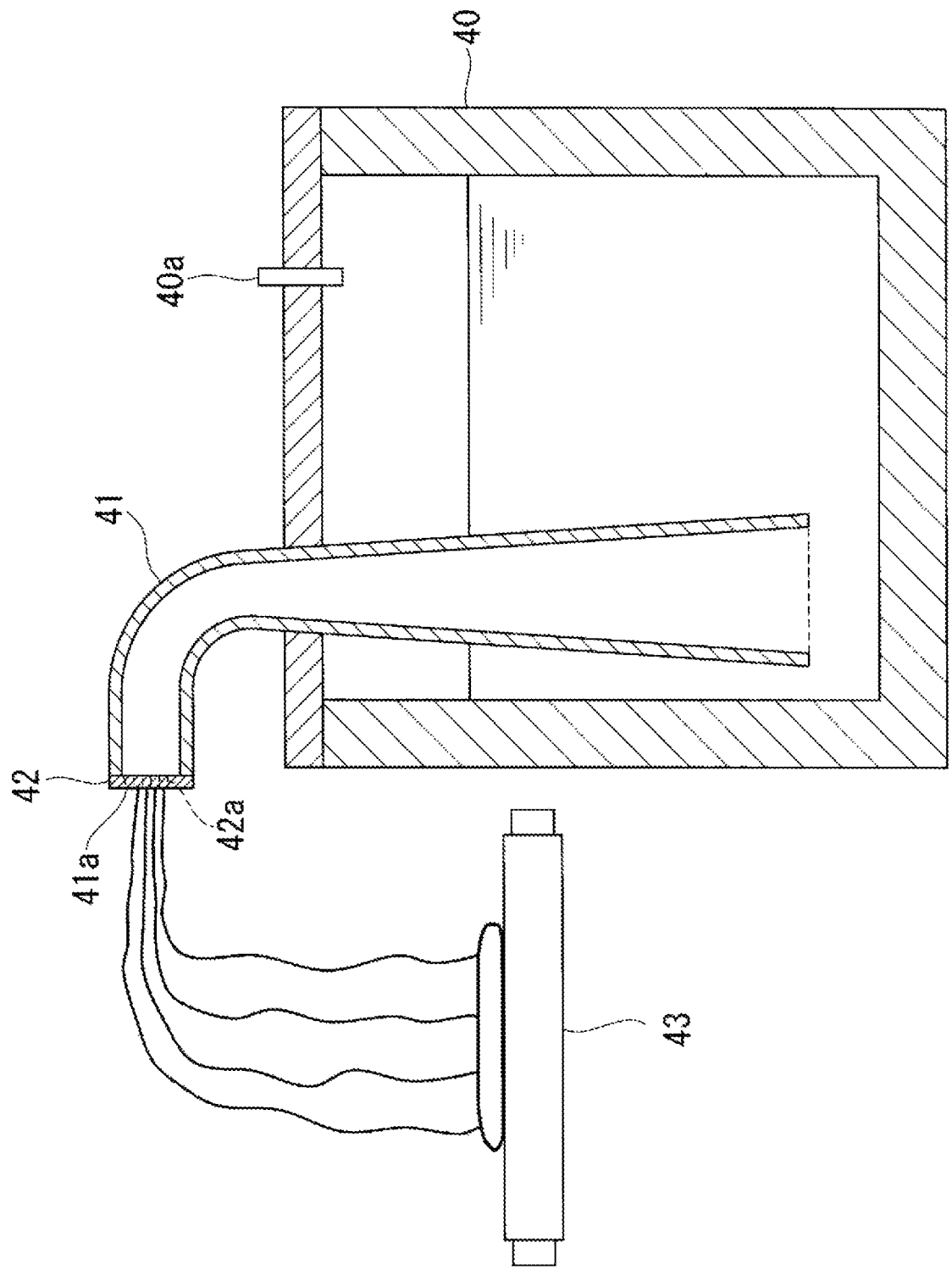
FIG. 1 is a brief front view of an aluminum fiber block forming device involved in a first embodiment of the disclosure.

For example, as shown in FIG. 1, aluminum molten in a sealed container 40 is prepared, the sealed container 40 is formed by ceramic, stainless steel and the like, a rear part of a curved pipe 41 of which a front end is curved is inserted therein, and when air, inert gas or the like is injected from a gas import pipe 40a to increase pressure in the sealed container 40 in a state that a front end part of the curved pipe 40 is exposed from the sealed container 40, the molten aluminum rises and reaches the front end part from the rear part of the curved pipe 41. When a nozzle 42 with multiple micropores 42a of which apertures are several μm~several mm and the apertures are preferably several μm~dozens of μm is arranged at an opening part 41a at the front end of the curved pipe 41, the molten aluminum is jetted into a space through the micropores 42a. As the aluminum, when aluminum having a purity of 99.9% or more is used, it is advantageous for processing. When aluminum having a purity of 99.99% or more is used, it is more advantageous for processing. However, an alloy with other metals can also be used. The space may be filled with air, may also be filled with inert gas such as nitrogen, and may further be filled with other gas.

Figure 3:
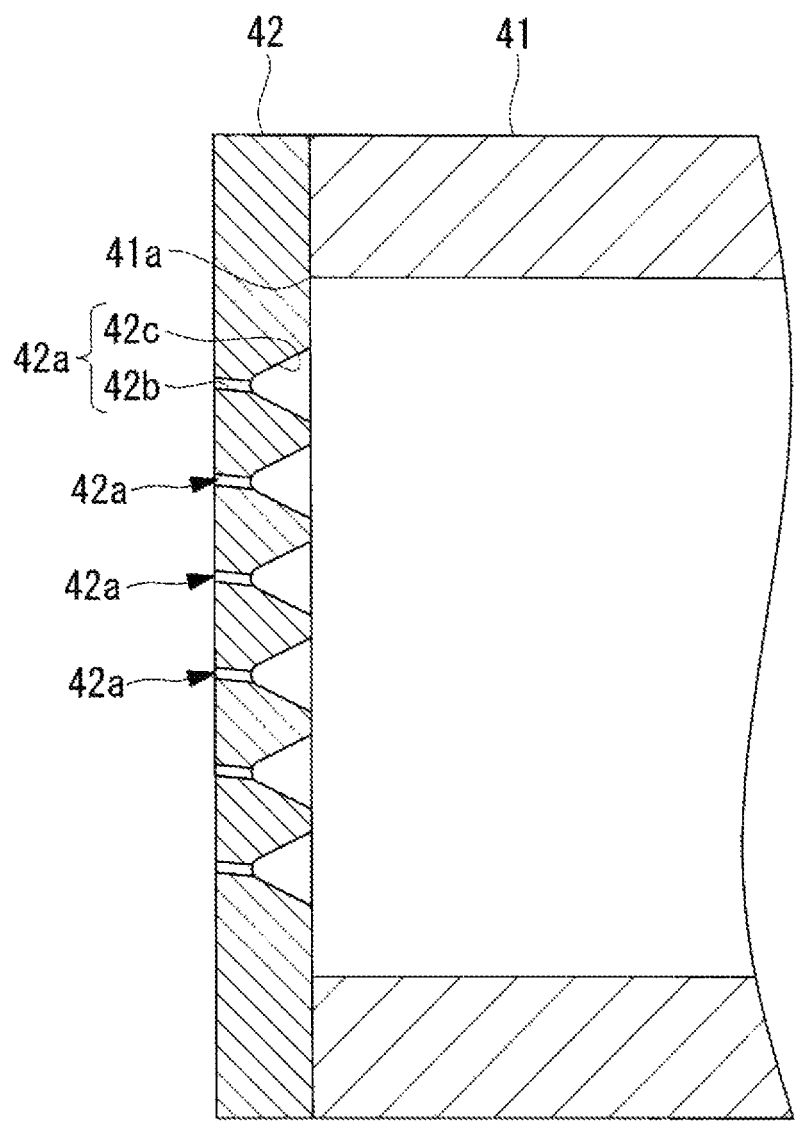
FIG. 3 is a main part sectional view of a curved pipe in FIG. 1.

In the embodiment, the nozzle 42 is arranged to jet the aluminum substantially in a horizontal direction. Therefore, the aluminum jetted from the micropores 42a of the nozzle 42 is cooled in a process of transversely flying through the space to form aluminum fibers. In addition, as shown in FIG. 3, in the embodiment, an outlet side opening 42b of each micropore 42a is inclined by a few degrees upwards from a jetting direction, so that a hanging time of the aluminum fibers may further be prolonged. Moreover, an inlet side opening 42c of each micropore 42a has a tapered shape of which a diameter is gradually reduced towards an outlet side. Therefore, the molten aluminum smoothly flows into the outlet side openings 42b, which is favorable for reducing breakage of the aluminum fibers after jetting.

The aluminum fibers formed by cooling the jetted aluminum in the space are made fall on a predetermined support surface, for example, a belt conveyor 43, thereby forming an aluminum fiber block on the belt conveyor 43.

Figure 2:
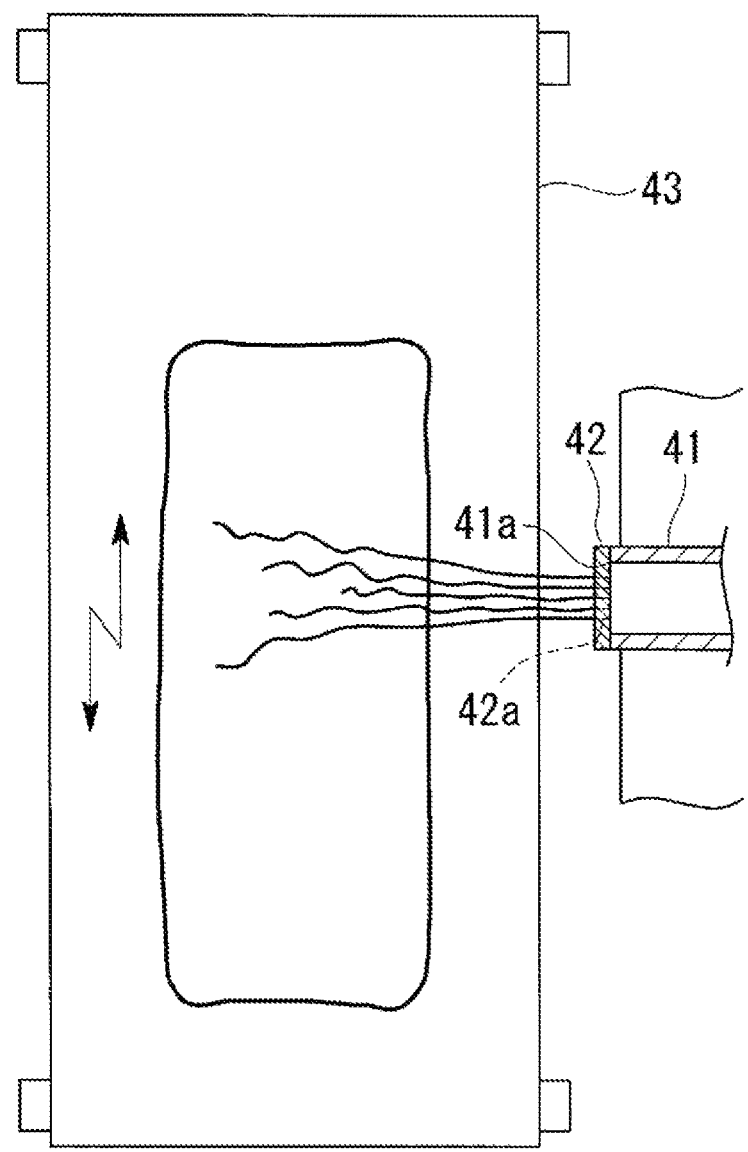
FIG. 2 is a brief top view of an aluminum fiber block forming device involved in a first embodiment of the disclosure.

Wherein, in the embodiment, the outlet side opening 42b of each micropore 42a of the nozzle 42 is inclined by a few degrees upwards from the jetting direction, so that positions where the aluminum fibers fall are randomly changed in the jetting direction (leftward-rightward direction in FIG. 1 and FIG. 2) of the aluminum, and perfect orientation of the aluminum fibers in the aluminum fiber block is prevented.

In the embodiment, as mentioned above, the molten aluminum is jetted from the nozzle 42, thereby forming the aluminum fiber block of which an average wire diameter is 50 μm or below. In addition, when the nozzle 42 is replaced with a nozzle with micropores 42a with another aperture, an aluminum fiber block with another average wire diameter may be formed.

Figure 4:
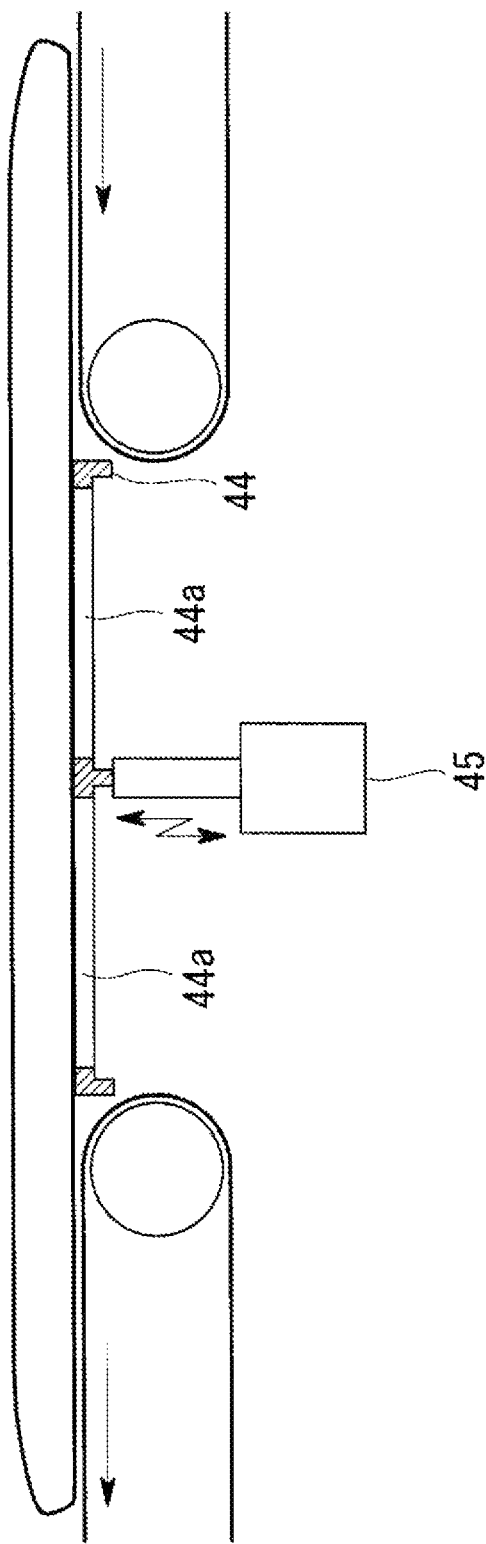
FIG. 4 is a brief front view of a short fiber removing device involved in a first embodiment of the disclosure.

Then, short fiber removing treatment is performed on the formed aluminum fiber block, as shown in FIG. 4. Treatment refers to the following treatment: the aluminum fiber block formed on the belt conveyor 43 is placed on a plate 44 in which multiple holes 44a are formed, or is made pass through the plate 44, and at this moment, vibration in, for example, an upward-downward direction, is applied to the plate 44 through a vibration application device such as an exciter 45, thereby making relatively short fibers in the aluminum fiber block to fall off the holes 44a of the plate 44.

Lengths of the fibers falling off the holes 44a may be regulated through regulation over sizes or shapes of the holes 44a and a direction, magnitude, frequency and the like of the applied vibration. In the embodiment, treatment is performed to remove short fibers shorter than 5 mm, but there may be some short fibers shorter than 5 mm remaining in the aluminum fiber block. On the other aspect, short fibers longer than 5 mm may also be removed, and some long fibers may be removed together with the short fibers. However, the objective of removing and reducing short fibers shorter than a predetermined length (for example, 5 mm) may be achieved. At this moment, aluminum particles, sagging from each micropore 42a of the nozzle 42 so as not to form fibers, of the aluminum may be removed. In addition, lengths of the short fibers to be removed are preferably smaller than 3 cm, and more preferably, are smaller than 5 cm.

In addition, the short fibers contact or are clamped less with other fibers in the aluminum fiber block, and thus are likely to fall off the holes 44a during vibration. Moreover, the aluminum fiber block may also be placed on a mesh instead of the plate 44, or is made pass through the mesh, and at this moment, vibration is applied to the mesh to make relatively short fibers in the aluminum fiber block fall off mesh openings. Moreover, air from a compressed air tank may further be blown to the aluminum fiber block at the same time when vibration is applied or instead of the vibration to remove the relatively short fibers in the aluminum fiber block. The relatively short fibers in the block may further be removed by other treatment.

Figure 5:
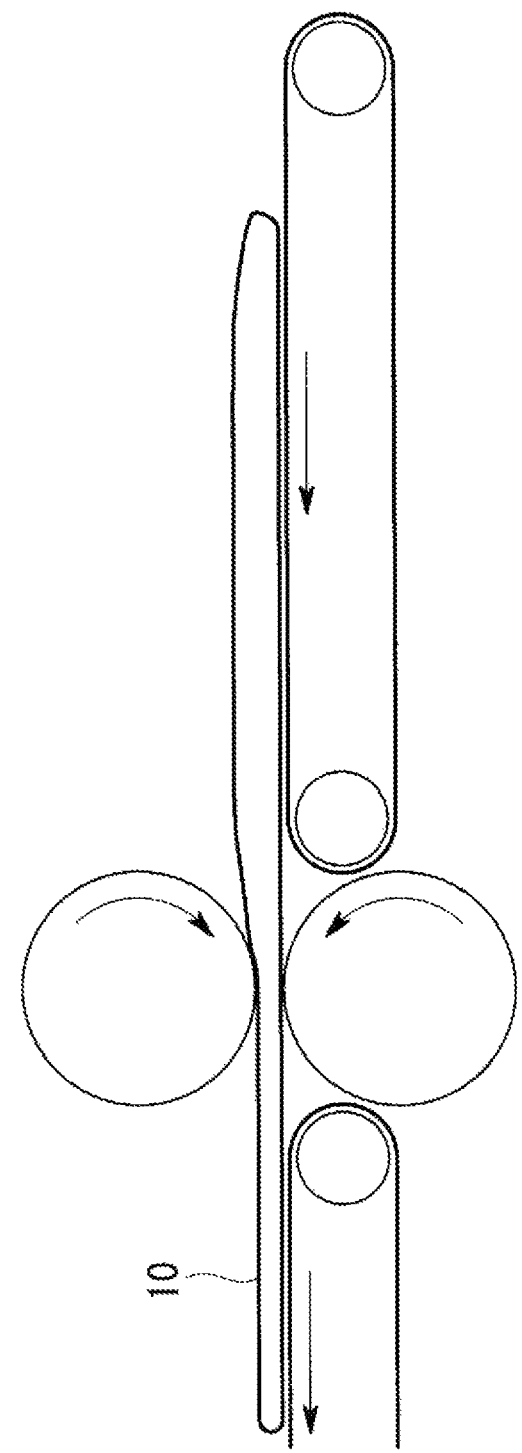
FIG. 5 is a brief front view of a pressurization device involved in a first embodiment of the disclosure.

The aluminum fiber block subjected to short fiber removing treatment may directly be used for the aluminum nonwoven fiber material for a current collector of an electrode. However, in the embodiment, as shown in FIG. 5, the aluminum fiber block subjected to short fiber removing treatment is pressurized by a pair of rollers, thereby forming the aluminum nonwoven fiber material. Pressure may be properly changed according to an expected shape or characteristic of the current collector or the electrode. Moreover, besides the rollers used for pressurization, the aluminum fiber block may also be clamped between a pair of planes for pressurization, the aluminum block fiber may be pressurized by a mold, and the aluminum fiber block may further be pressurized by another method.

Preferably, in the foregoing formed aluminum nonwoven fiber material or the following electrode, an average value of numbers of ends of the aluminum fibers appearing on one surface and the other surface in a thickness direction of the aluminum nonwoven fiber material is smaller than 5 per square centimeter. When such a structure is formed, a ratio of long fibers in the aluminum nonwoven fiber material is increased, and resistance of movement of electrons to input/output terminals arranged at ends and the like of the aluminum nonwoven fiber material may be reduced. In addition, the numbers of the ends of the aluminum fibers appearing on one surface and the other surface in the thickness direction of the aluminum nonwoven fiber material are preferable as small as possible, and furthermore, the average value is preferably smaller than 3 per square centimeter, more preferably, smaller than 1.

[Formation of an Electrode]

At first, a formed aluminum nonwoven fiber material is cut into a predetermined size for the electrode. For example, in a part of a cutting procedure, the aluminum nonwoven fiber material is moved in its length direction through a belt conveyor and the like, and the aluminum nonwoven fiber material is simultaneously cut in its length direction through a rotating disc-shaped cutter which is arranged at a predetermined position in a width direction of the aluminum nonwoven fiber material.

On the other aspect, liquiform or gelatinous slurry containing active substance powder 20 which undergoes chemical reaction during charging, a conductive agent 30 and a binder B is manufactured. The slurry is manufactured by performing treatment such as blending on a mixture formed by mixing the active substance powder 20, the conductive agent 30 and the binder B.

Then, the aluminum nonwoven fiber material cut into the predetermined size is soaked in the slurry, and the slurry is imported into the aluminum nonwoven fiber material. The aluminum nonwoven fiber material may also be coated with the slurry, thereby importing the slurry into the aluminum nonwoven fiber material. In addition, importing the slurry into the aluminum nonwoven fiber material not only includes importing the slurry into all of multiple gaps or concave parts existing between the adjacent aluminum of the aluminum nonwoven fiber material, but also includes importing the slurry into a part of the multiple gaps or concave parts only.

Next, a drying procedure in which the aluminum nonwoven fiber material into which the slurry is imported is dried by vacuum drying is performed. Therefore, the binder B in the slurry is cured, and the active substance powder 20 and conductive agent 30 in the slurry are retained in each aluminum fiber of the aluminum nonwoven fiber material by the binder B.

Later on, a pressurization procedure in which the aluminum nonwoven fiber material subjected to the drying procedure is pressurized is performed. For the pressurization procedure, treatment over the aluminum nonwoven fiber material by a pair of rollers, treatment implemented by clamping the aluminum nonwoven fiber material between a pair of planes, treatment of pressurizing the aluminum nonwoven fiber material by a mold or the like may be performed.

In such a method, the pressurization procedure is performed after the drying procedure, and the pressurization procedure may also be performed before the drying procedure. For some types of binders B, if pressurization is performed after drying, a capability of retaining the active substance powder 20 may be reduced. Therefore, when such a binder B is used, the pressurization procedure may be performed before the drying procedure to prevent reduction in the retaining capability of the binder B.

On the other aspect, when the aluminum fiber block subjected to short fiber removing treatment is directly used for the aluminum nonwoven fiber material for the current collector, the slurry may be smoothly imported when being imported into the aluminum nonwoven fiber material.

By virtue of aluminum, particularly aluminum with purity of preferably over 99.9% and aluminum with purity of more preferably over 99.99%, when pressurization in FIG. 5 is performed or the pressurization procedure is finished, in a part where aluminum fibers contact crosswise, the cross two aluminum fibers are deformed to be mutually sunken. In other words, the aluminum fibers in the contact part are flat, and thus the cross two aluminum fibers seem to be mutually sunken. Under such a condition, movement resistance of electrons in contact parts between the aluminum fibers may be reduced, which is favorable for reducing resistance of movement of the electrons to input/output terminals.

Figure 15:
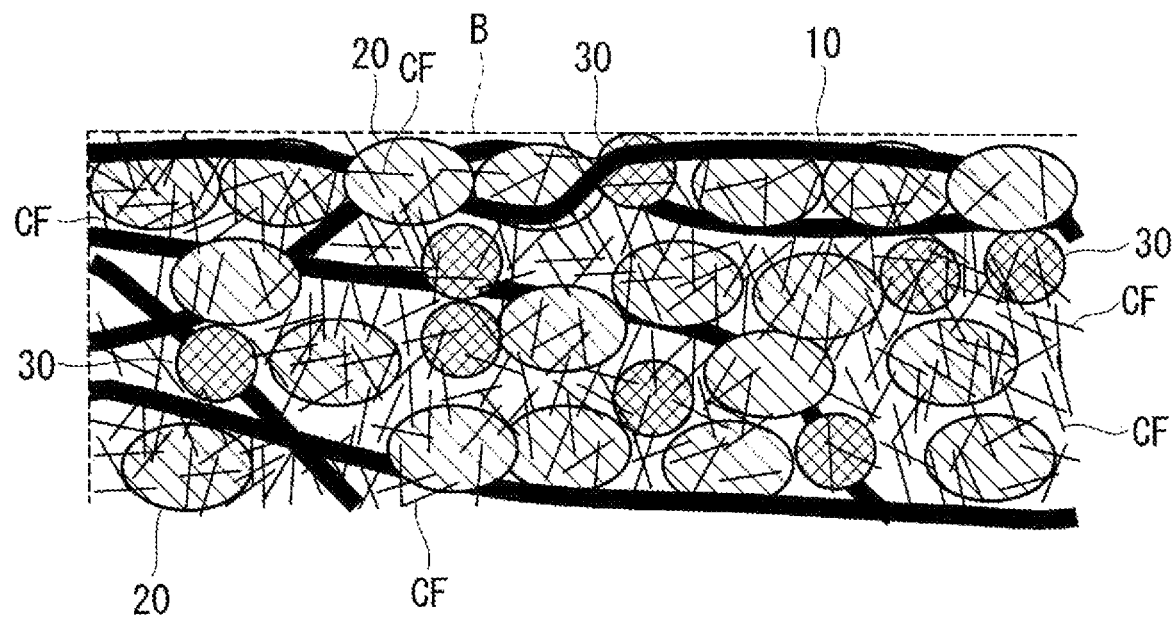
FIG. 15 is a sectional image diagram of an electrode according to a fourth transformation of a first embodiment of the disclosure.

Moreover, for the slurry, not only may the active substance powder 20, the conductive agent 30 and the binder B be used, but also slurry containing powder of CFs with an average thickness of smaller than 0.5 μm, preferably smaller than 0.3 μm, is included. Under such a condition, as shown in FIG. 15, the slurry is imported into the aluminum nonwoven fiber material, and multiple CFs are arranged in the gaps formed in the aluminum nonwoven fiber material. The CFs contact with the aluminum fibers or the active substance powder 20 or the conductive agent 30 or other CFs. In the embodiment, CFs with an average thickness of 0.2~0.2 μm and lengths of 20~200 μm are used. In addition, resistivity of a carbon type conductive agent 30 is 0.2~0.3 Ω·cm, and resistivity of the CFs is, for example, $5 \times 10-5$ Ω·cm.

For example, even when the active substance powder 20 does not directly contact with the aluminum fibers, the active substance powder 20 is also electrically connected with the aluminum fibers through the CFs. Moreover, even when the active substance powder 20 directly contacts with the aluminum fibers, due to existence of connections through the CFs, resistance between the active substance powder 20 and the aluminum fibers is further reduced.

In such a manner, the movement resistance of the electrons between the active substance powder 20 and the aluminum fibers may be reduced by the CFs with high conductivity, thereby achieving favorability for reducing the resistance of movement of the electrons to the input/output terminals.

Figure 16:
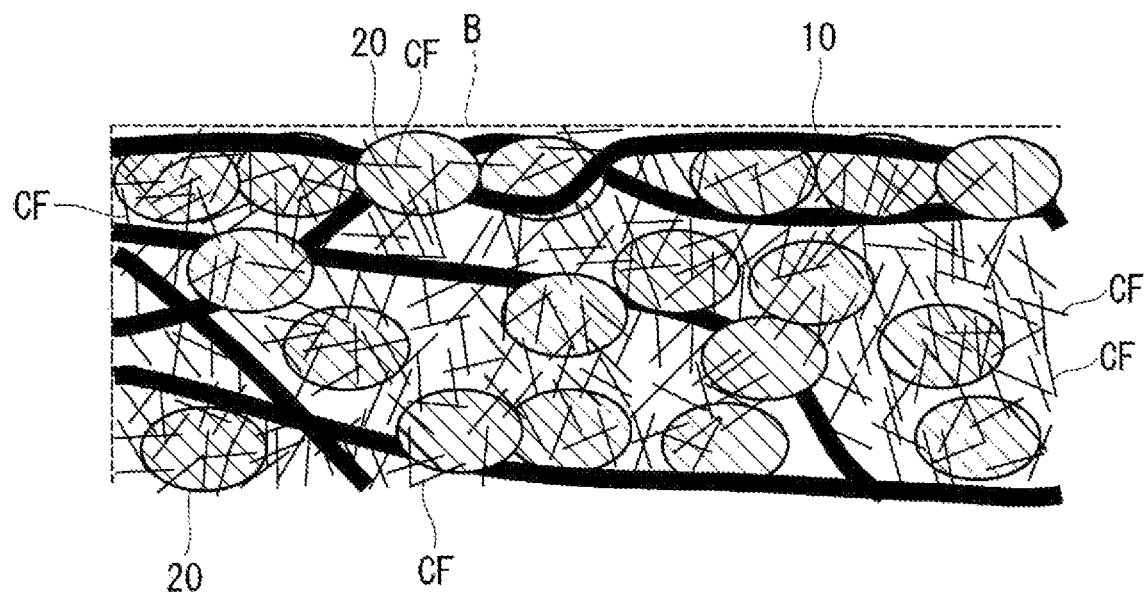
FIG. 16 is a sectional image diagram of an electrode according to a fifth transformation of a first embodiment of the disclosure.

In addition, as shown in FIG. 16, slurry which does not include the conductive agent 30 but includes the CFs may further be used. Under such a condition, when the slurry is imported into the aluminum nonwoven fiber material, multiple CFs are arranged in the gaps formed in the aluminum nonwoven fiber material, which is favorable for reducing the resistance between the active substance powder 20 and the aluminum fibers.

Figure 17:
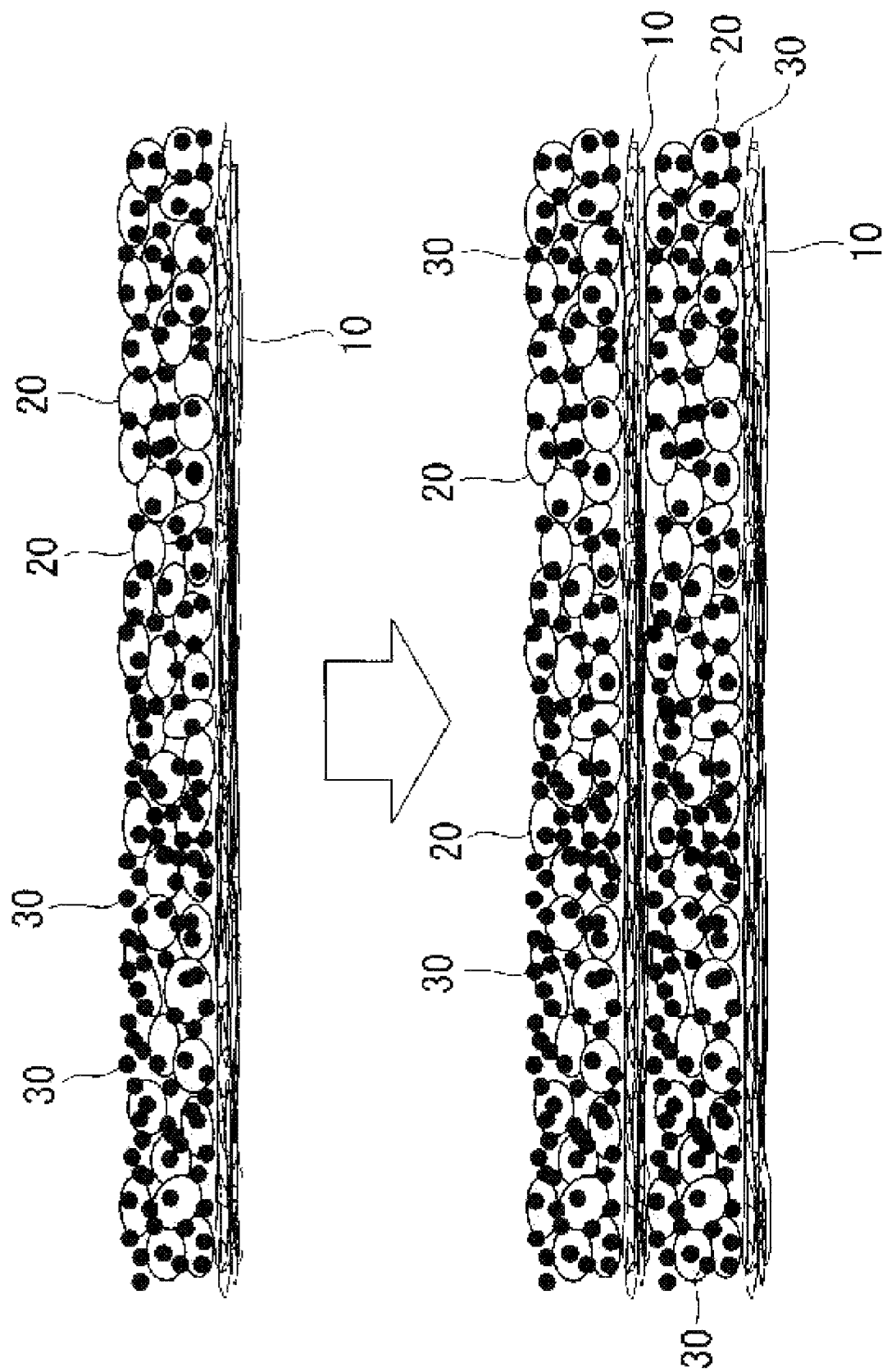
FIG. 17 is a sectional image diagram of an electrode according to a sixth transformation of a first embodiment of the disclosure.

Moreover, in such a method, an example of cutting the aluminum nonwoven fiber material with a predetermined thickness for the electrode into the predetermined size and then importing the slurry into it is shown. Compared with the example, as shown in FIG. 17, for example, the electrode may further be manufactured by forming multiple aluminum nonwoven fiber materials 10 with thicknesses smaller than ½ of the predetermined thickness (for example, smaller than 10 μm), importing the slurry into each aluminum nonwoven fiber material 10, drying the slurry and then laminating and cutting the multiple aluminum nonwoven fiber materials 10 into the predetermined size. In addition, the aluminum nonwoven fiber materials 10 into which the slurry has yet not been imported may be pressurized by the rollers, and may also not be pressurized. Moreover, communicating components arranged at ends of the multiple aluminum nonwoven fiber materials 10 which are laminated for mutual connection may further be arranged.

By such treatment, there is no problem that the slurry is imported deeply into the gaps in the aluminum nonwoven fiber material, and an aluminum fiber foil (the aluminum nonwoven fiber material) 10 may be coated with active substance slurry, like a usual aluminum foil. Moreover, in an laminated body formed by laminating the aluminum fiber foils 10 coated with the slurry, lithium ions may move in a thickness direction of the aluminum fiber foils 10 through the gaps of the aluminum fiber foils 10, so that a thick electrode may be formed, and capacitance may be increased. In other words, a number of the laminated aluminum fiber foils 10 coated with the slurry may be increased to increase a charging/discharging speed, simultaneously thicken the electrode and increase the capacitance of the electrode.

In addition, as the slurry, slurry containing adsorbent powder adsorbed by electrolyte ions during charging may further be manufactured to replace the active substance powder 20. Under such a condition, after the drying procedure, the adsorbent powder is retained in each aluminum fiber of the aluminum nonwoven fiber material to replace the active substance powder 20.

In addition, for efficiently reducing the resistance, an average length of the CFs is preferably more than a half of an average particle size of the active substance powder 20 and the adsorbent powder, and is more preferably more than ⅔ of the average particle size.

Moreover, after the active substance powder or the adsorbent powder is imported into the aluminum nonwoven fiber material, when the active substance powder 20, the adsorbent powder, the CFs and the like are physically retained in the aluminum fibers in the aluminum nonwoven fiber material by the pressurization procedure, slurry without any binder B may be used.

[Active Substance Powder]

As the foregoing active substance powder, any substance which may be retained on the aluminum nonwoven fiber material used as the current collector by the binder B and the like may be adopted, and a substance with high cycling performance is preferred. As an example of an active substance, a lithium cobaltate ($LiCoO2$) or ferric phosphate type active substance may be used. In addition, an active substance well-known for an electrode, particularly, a positive electrode, of a secondary battery may be used.

[Adsorbent Powder]

As the adsorbent powder used as an alternative of the active substance powder, any substance which may be retained on the aluminum nonwoven fiber material used as the current collector may be retained by the binder B and the like may be adopted, and a substance with high cycling performance is preferred. As an example of the adsorbent powder, a polyacenes (PAS), polyaniline (PAN), activated carbon, carbon black, graphite, a carbon nanotube and the like may be used. In addition, a substance well-known for an electrode, particularly, an positive electrode, of a double electric layer capacitor may be used.

Preferably, the active substance powder or the adsorbent powder is obtained by crushing with a mortar, a ball mill, a vibrating ball mill and the like to make its average particle size smaller than a predetermined value. The predetermined value may be set to be a value obtained by adding 10 μm to the average wire diameter of the aluminum nonwoven fiber material and the like. For example, when the average wire diameter of the aluminum nonwoven fiber material is 20 μm, the average particle size of the active substance powder or the adsorbent powder is preferably smaller than 30 μm. Therefore, a contact area of each aluminum fiber of the aluminum nonwoven fiber material and the active substance powder or the adsorbent powder is enlarged, and contributions to increase of the charging/discharging speed may be made.

[Binder]

As the binder, thermoplastic resin, a polysaccharide type high polymer material or the like may be used. As an example of a material for the binder, a copolymer of a polyacrylic acid resin, polytetrafluoroethylene (PTFE), polyvinylidene fluoride (PVdF), vinylidene fluoride (VdF) and hexafluoropropylene (HFP) and the like may be used. In addition, a binder well-known for an electrode of a secondary battery or a double electric layer capacitor may be used.

[Conductive Agent]

As the conductive agent, any material with conductivity may be used, and preferably, a material without chemical changes caused by an electrolyte or a solvent is used. As an example of the conductive agent, black lead or black carbon may be used. In addition, a conductive agent well-known for an electrode of a secondary battery or a double electric layer capacitor may be used.

The manufactured electrode may be applied to an electrode of electric power storage equipment such as a double electric layer capacitor, a secondary battery and a hybrid capacitor including a lithium ion capacitor, and for example, may be applied to an positive electrode and negative electrode of the double electric layer capacitor, may be applied to a positive electrode of a lithium ion secondary battery used as an example of the secondary battery, and may be applied to an positive electrode of the lithium ion capacitor. Its application examples will be described in the following embodiments.

[Application to a Coin Type Secondary Battery]

Figure 7:
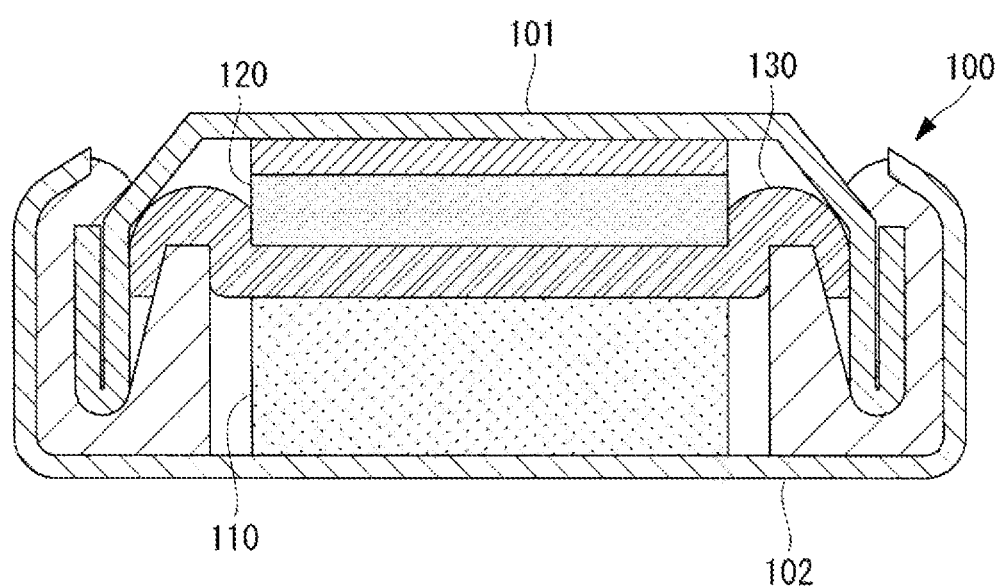
FIG. 7 is a sectional view of a coin type secondary battery utilizing an electrode involved in a first embodiment of the disclosure.

FIG. 7 shows an example of a coin type secondary battery adopting the electrode of the first embodiment. The coin type secondary battery is provided with a casing (outer packaging jar) 100 with a casing body 102 and a cover 101 and an electric power storage part accommodated in the casing 100. The electric power storage part is provided with the electrode of the first embodiment as a positive electrode 110, and moreover, is provided with an negative electrode 120 counteracting with the positive electrode 110 and a partition plate 130 arranged between the positive electrode 110 and the negative electrode 120. The positive electrode 110 forms surface contact with the casing body 102, and the negative electrode 120 forms surface contact with the cover 101, so that the cover 101 and the casing body 102 may realize functions of input/output terminals of the positive electrode 110 and the negative electrode 120.

Under such a condition, active substance powder 20 is retained on the aluminum nonwoven fiber material of the positive electrode 110. Moreover, the negative electrode 120 has a well-known negative electrode structure and material of a secondary battery. For a lithium ion secondary battery, a carbon material such as graphite is used as an active substance, and a copper foil is used as a current collector. The partition plate 130 realizes electric insulation of the positive electrode 110 and the negative electrode 120, as long as the partition plate has ion permeability and resistance to oxidation and reduction on a contact surface of the positive electrode 110 and the negative electrode 120. For example, a porous polymer or inorganic material, an organic and inorganic composite material, fiberglass and the like may be used. In addition, a well-known partition plate for a secondary battery may be used.

The casing 100 accommodating the electric power storage part is filled with an electrolyte solution. An electrolyte used as the electrolyte solution may be a lithium salt, a potassium salt, a sodium salt, a magnesium salt and the like, and the lithium salt is used for the lithium ion secondary battery. A solvent for dissolving the electrolyte is a non-aqueous solvent, and the non-aqueous solvent may be ethylene carbonate, propylene carbonate, dimethyl carbonate, diethyl carbonate, carbonate ester and the like. In addition, an well-known electrolyte and solvent for a secondary battery may be used. During charging/discharging, there occurs chemical reaction that ions such as lithium ions are released into the electrolyte solution from the active substance powder 20 of the positive electrode 110 or chemical reaction that the ions such as the lithium ions enter the active substance powder 20.

In the coin type secondary battery structured like this, one surface in a thickness direction of the aluminum nonwoven fiber material of the positive electrode 110 contacts with the casing body 102. Moreover, the whole range from one surface to the other surface in the thickness direction of the aluminum nonwoven fiber material of the positive electrode 110 is filled with the active substance powder 20, and much active substance powder 20 contacts with each aluminum fiber of the aluminum nonwoven fiber material. Therefore, distances between the aluminum fibers carrying electrons to the input/output terminals and the active substance powder 20 are shortened, which is favorable for increasing the charging/discharging speed.

Moreover, aluminum short fibers shorter than a predetermined length are removed from an aluminum fiber block, so that a ratio of long fibers in the aluminum nonwoven fiber material is increased. Moreover, the active substance powder directly contacts with the aluminum fibers, or the aluminum fibers and the active substance powder are arranged close to each other and conducted by a conductive agent 30 and the like. Therefore, when the electrons are exchanged between the active substance powder and each aluminum fiber, resistance of movement of the electrons to the input/output terminals arranged at ends and the like of the aluminum nonwoven fiber material may be reduced.

Figure 8:
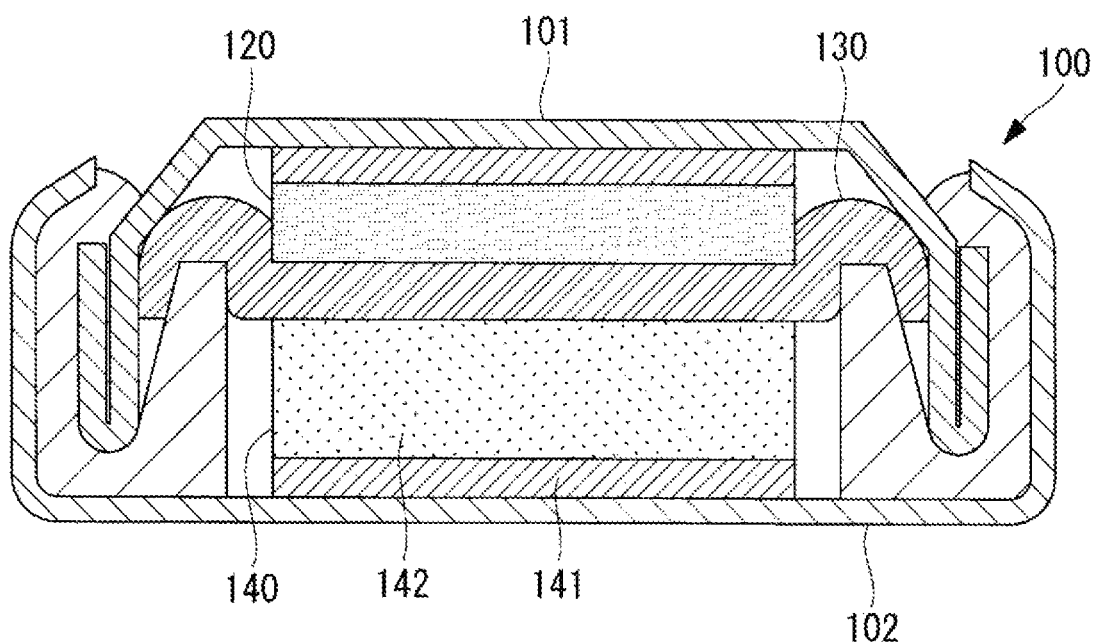
FIG. 8 is a sectional view of an existing coin type secondary battery.

In addition, FIG. 8 shows an example of an existing coin type secondary battery. The coin type secondary battery is provided with a positive electrode 140, and the positive electrode 140 is provided with an aluminum foil current collector 141 and an electrode layer 142 with which one surface in a thickness direction of the current collector 141 is coated. The electrode layer 142 includes active substance power, a conductive agent, a binder and the like. A space of the coin type secondary battery is limited, so that an amount of active substance powder of the existing coin type secondary battery is limited to be a thickness amount of the current collector 141. Moreover, electrons of the active substance powder arranged on the side where a partition plate 130 is arranged are moved to the current collector 141 by the active substance powder or conductive agent arranged between the partition plate 130 and the current collector 141, so that the charging/discharging speed is unsuitable to be increased.

In addition, in the coin type secondary battery, an electrode structure of the first embodiment may be applied to the negative electrode 120. Under such a condition, the current collector of the electrode is formed by the aluminum nonwoven fiber material, and as the active substance powder 20, lithium titanate, titanium oxide, tungsten oxide, tin oxide and the like is used to replace a carbon material.

[Application to a Laminated Secondary Battery]

Under the condition of a secondary battery laminated with multiple layers of electric power storage parts formed by positive electrodes, negative electrodes and partition plates, like the coin type secondary battery, the electrode structure of the first embodiment may be applied to only the positive electrode, or only the negative electrode, and both the positive electrode and the negative electrode.

[Application to a Double Electric Layer Capacitor]

Figure 9:
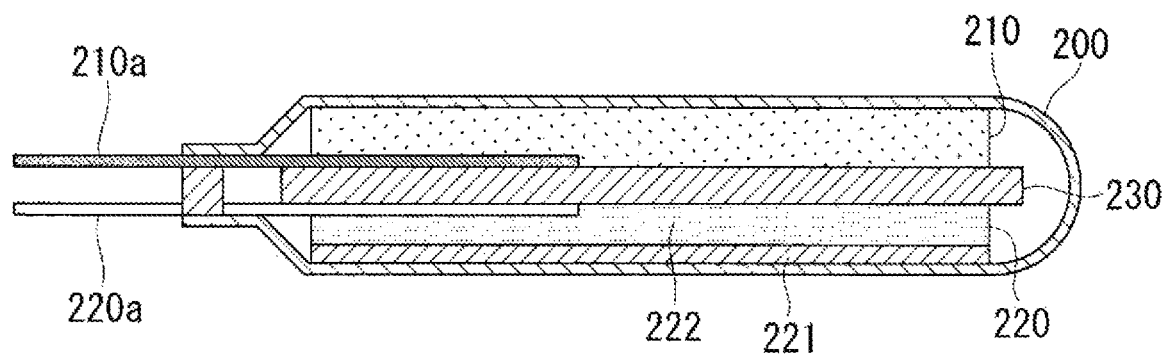
FIG. 9 is a sectional view of a double electric layer capacitor utilizing an electrode involved in a first embodiment of the disclosure.

FIG. 9 shows an example of a double electric layer capacitor utilizing the electrode of the first embodiment. The double electric layer capacitor is provided with, for example, a container 200 and an electric power storage part accommodated in the container 200. The electric power storage part is provided with the electrode of the first embodiment as an positive electrode 210, and moreover, is provided with a negative electrode 220 counteracting with the positive electrode 210 and a partition plate 230 arranged between the positive electrode 210 and the negative electrode 220. A positive input/output terminal 210a is connected to the positive electrode 210, similarly, a negative input/output terminal 220a is connected to the negative electrode 220, and each input/output terminal extends out of the container 200.

Under such a condition, adsorbent powder is retained on an aluminum nonwoven fiber material of the positive electrode 210. Moreover, the negative electrode 220 has a well-known negative electrode structure and material of a double electric layer capacitor, and is provided with a current collector 221 formed by, for example, an aluminum foil, and an electrode layer 222 with which one surface in a thickness direction of the current collector is coated. The electrode layer 222 includes the adsorbent powder, a conductive agent, a binder and the like.

The partition plate 230 realizes electric insulation of the positive electrode 210 and the negative electrode 220, as long as the partition plate has resistance to oxidation and reduction on a contact surface of the positive electrode 210 and the negative electrode 220. For example, a porous polymer or inorganic material, an organic and inorganic composite material, fiberglass and the like may be used. In addition, a well-known partition plate for a double electric layer capacitor may be used.

The container 200 accommodating the electric power storage part is filled with an electrolyte solution. The electrolyte solution includes a non-aqueous solvent and an electrolyte, as long as the electrolyte or the non-aqueous solvent is a well-known substance for a double electric layer capacitor. The electrolyte may be, for example, an ammonium salt and a phosphor salt. The non-aqueous solvent may be, for example, cyclic carbonate, chain type carbonate, a cyclic ester, a chain ester, cyclic ether, chain ether, nitriles and a sulfur-containing compound.

One end of the aluminum nonwoven fiber material of the positive electrode 210 of the double electric layer capacitor is connected to the positive input/output terminal 210a. Moreover, the whole range from one surface to the other surface in a thickness direction of the aluminum nonwoven fiber material of the positive electrode 210 is filled with the adsorbent powder, and much adsorbent powder contacts with each aluminum fiber of the aluminum nonwoven fiber material. Therefore, distances between the aluminum fibers carrying electrons to the positive input/output terminal 210a and the adsorbent powder are shortened, which is favorable for increasing a charging/discharging speed. An existing positive electrode structure is the same as the negative electrode 220, so that, compared with the negative electrode 220, it is very easy to understand the foregoing advantage.

Moreover, aluminum short fibers shorter than a predetermined length are removed from an aluminum fiber block, so that a ratio of long fibers in the aluminum nonwoven fiber material is increased. Therefore, during charging, electrolyte ions are adsorbed onto a surface of the adsorbent powder, and when the electrons are exchanged between the adsorbent powder and each aluminum fiber, resistance of movement of the electrons to the input/output terminal 210a arranged at an end of the aluminum nonwoven fiber material may be reduced.

In addition, in the double electric layer capacitor, the electrode structure of the first embodiment may further be applied to the negative electrode 220.

According to the first embodiment, as mentioned above, an positive electrode, with active substance powder or adsorbent powder arranged in the vicinity of high-purity aluminum fibers, of electric power storage equipment may be formed. Therefore, electric power storage equipment with higher capacitance, low deformation resistance and high charging/discharging performance may be manufactured.

Moreover, a manufacturing process for an aluminum foil used in a usual capacitor, a secondary battery or the like is as follows: a very large quadrangular prism-shaped aluminum ingot called as a slab is manufactured, rolling is performed for many times after cutting and heating, and surface treatment and the like are further performed. Therefore, very much energy and cost are required. On the other aspect, aluminum fibers used in the first embodiment may be manufactured by jetting after a high-purity aluminum ingot is simply melted Moreover, when a foil is formed by rolling the aluminum fibers into which adsorbent powder, active substance powder, a conductive agent and the like are imported, pressing pressure may be reduced. Therefore, no large-sized equipment is required, and a current collector foil and an positive electrode foil may be simply manufactured with low cost.

Moreover, compared with formation of the current collector into a foil like the positive electrode shown in FIG. 8, when the current collector is formed to be linear or meshed like the positive electrode shown in FIG. 7, a larger amount of adsorbent powder or active substance powder may contact with the current collector, and moreover, the adsorbent powder and the active substance powder may exist within a range close to the current collector. Moreover, when the current collector is a foil, a distance between the adsorbent powder or the active substance powder and foil is prolonged. Under many conditions, a thickness of the electrode is 100 μm, and at this moment, the distance between the adsorbent powder or the active substance powder and foil is 100 μm. If the adsorbent powder or the active substance powder may be uniformly placed in a very fine aluminum nonwoven fiber material, favorability for increasing capacitance and simultaneously reducing internal resistance is achieved.

Moreover, the high-purity aluminum fibers are very soft, and there exist relatively large gaps between the fibers which have yet not been pressed and fixed. The adsorbent powder, the active substance powder, the conductive agent and the like are imported into the gaps, and during pressing, a foil with the adsorbent powder, the active substance powder and the like closed in the aluminum nonwoven fiber material (the current collector) with fine meshes (holes or gaps) of several μm may be formed.

In addition, in the embodiment, an example of jetting the aluminum substantially in the horizontal direction from the micropores 42a of the nozzle 42. However, the nozzle 42 may further be arranged to be downward, so that the aluminum fibers jetted downwards from the micropores 42a of the nozzle 42 fall on the belt conveyor 43. Under such a condition, the aluminum fiber block may also be formed on the belt conveyor 43.

Figure 10:
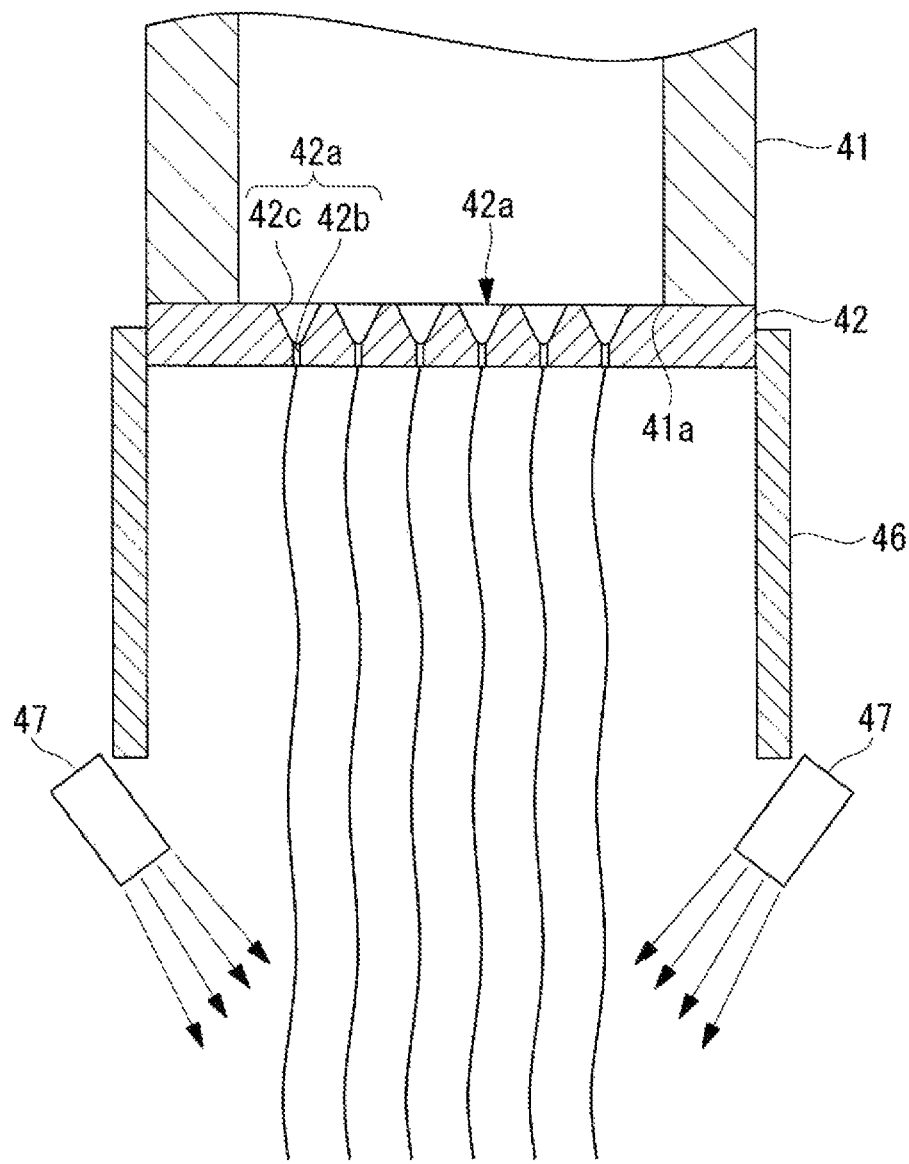
FIG. 10 is a main part sectional view of a curved pipe, a surrounding component and an air blowing part according to a first transformation of a first embodiment.

In addition, when an aluminum fiber block with a relatively small average wire diameter is formed, the nozzle 42 is preferably arranged to be downward sometimes. For example, as shown in FIG. 10, the nozzle 42 is arranged to be downward, and moreover, the outside side openings 42b of the micropores 42a are formed in a manner that their axes are parallel to a vertical axis. Therefore, the aluminum fibers are unlikely to be intertwined. Then, a surrounding component 46 surrounding a lower part of the nozzle 42 and an air blowing part 47 supplying downward air to the aluminum fibers which fall downwards after being jetted from the surrounding component 46 are arranged, and by the air, a downward force is applied to the aluminum fibers, and a force in a drawing direction is applied to the aluminum fibers. This is favorable for effectively manufacturing long fibers with a relatively small average wire diameter, for example, long fibers with an average wire diameter of several μm and 50 μm. In addition, even if there is no surrounding component 46, the same action effect may also be achieved. Moreover, multiple air blowing parts 47 may be arranged in a circumferential direction, and a single air blower with an annular exhaust nozzle may also be arranged.

Figure 11:
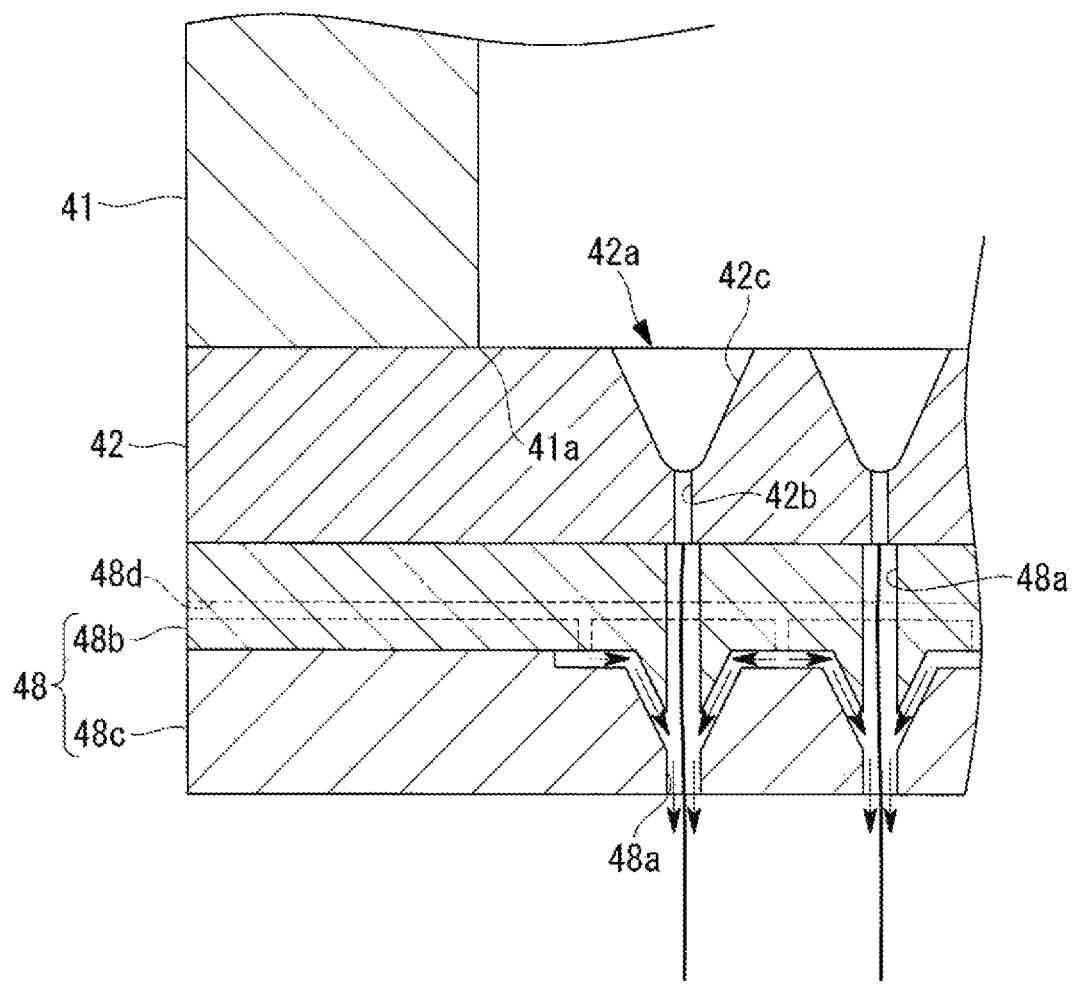
FIG. 11 is a main part sectional view of a curved pipe, a surrounding component and an air blowing part according to a second transformation of a first embodiment.

Moreover, as shown in FIG. 11, as an alternative of the surrounding component 46, multiple surrounding components 48 surrounding the aluminum fibers jetted from the micropores 42a may also be arranged. For example, as shown in FIG. 11, the surrounding components 48 are mounted on a lower surface of the curved pipe 41 or the nozzle 42, multiple through holes 48a corresponding to each micropore 42a and extending in a vertical direction are formed in the surrounding components 48, and then the aluminum fibers jetted from each micropore 42a pass through each through hole 48a. Moreover, the surrounding components 48 are formed by first blocks 48b mounting the surrounding components 48 on the lower surface of the curved pipe 41 or the nozzle 42 and second blocks 48c mounted on lower surfaces of the first blocks 48b, gaps communicated with each through hole 48a are formed between the first blocks 48b and the second blocks 48c, and air supply paths 48d supplying air are formed in the gaps.

Under such a condition, multiple aluminum fibers jetted from the nozzle 42 are surrounded by each through hole 48a, and moreover, the air from the air supply paths 48d is blown downwards (an extrusion direction of the aluminum fibers) in each through hole 48a after passing through the gaps. Therefore, the downward force is accurately applied to each aluminum fiber. In other words, the gaps function as the air blowing parts supplying the downward air into the through holes 48a.

In addition, such a structure that the aluminum fibers jetted from at most four micropores 42a are surrounded by only one through hole 48a may be formed. Under such a condition, the downward force may also be accurately applied to each aluminum fiber.

Moreover, as an alternative of the air blower 47, a force application mechanism for applying the downward force to the downward aluminum fibers may also be arranged. For example, a pair of rollers are arranged below the nozzle 42, the aluminum fibers are softly clamped by the rollers, and meanwhile, the rollers may rotate to apply the downward force to the aluminum fibers. The downward force may also be applied to the aluminum fibers by other mechanisms.

Figure 12:
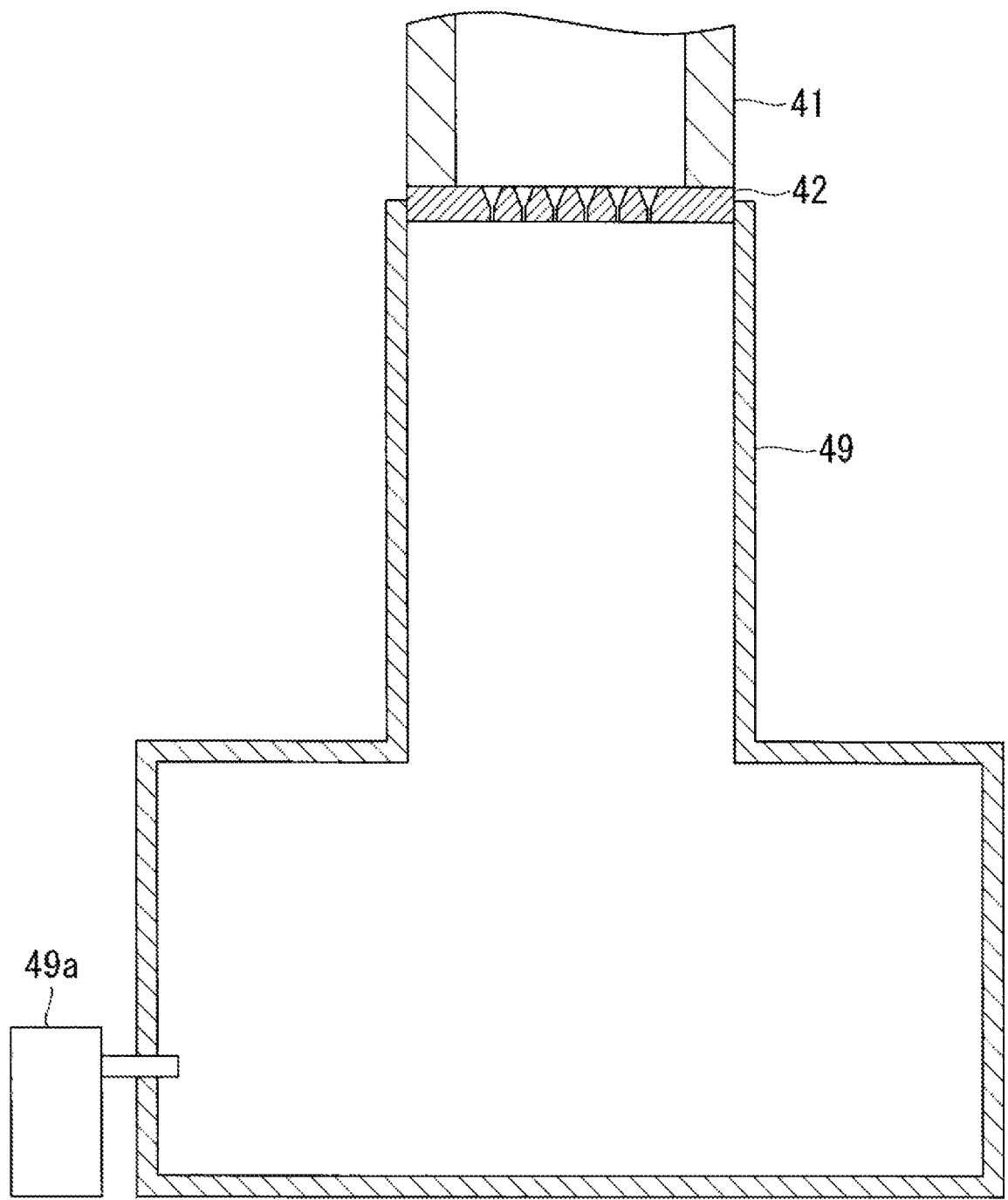
FIG. 12 is a main part sectional view of a curved pipe and a container according to a third transformation of a first embodiment.

On the other aspect, for efficiently manufacturing the long fibers with the relatively small average wire diameter, for example, the long fibers with the average wire diameter of several μm and 50 μm, as shown in FIG. 12, the lower part of the nozzle 42 may be sealed by a container 49, and the interior of the container 49 is turned into negative pressure by a vacuumizing device 49a. Under such a condition, the aluminum fiber block is formed on a bottom surface of the container 49. Moreover, the air blower 47 or force application mechanism which applies the downward force to the aluminum fibers may also be arranged in the container 49.

In addition, even under the condition that the aluminum fibers fly substantially in the horizontal direction, as shown in FIG. 1, the air blower or force application mechanism which applies a drawing force in the horizontal direction to the aluminum fibers flying substantially in the horizontal direction is arranged, which is favorable for efficiently manufacturing the long fibers with the average wire diameter of several μm and 50 μm. Moreover, the space where the aluminum fibers fly substantially in the horizontal direction is turned into negative pressure, which is also favorable for efficiently manufacturing the long fibers with the average wire diameter of several μm and 50 μm.

Moreover, the container 49 shown in FIG. 12 may also be vacuumized or filled with inert gas such as argon or nitrogen, thereby reducing or preventing oxidation of surfaces of the aluminum fibers jetted from the nozzle 42. Or, the formed aluminum fiber block or the aluminum nonwoven fiber material may be soaked in a chemical such as nitric acid at a concentration of about 15 weight percent or sodium hydroxide at a concentration of about 10 weight percent to remove oxide films on the surfaces of the aluminum fibers.

Figure 18:
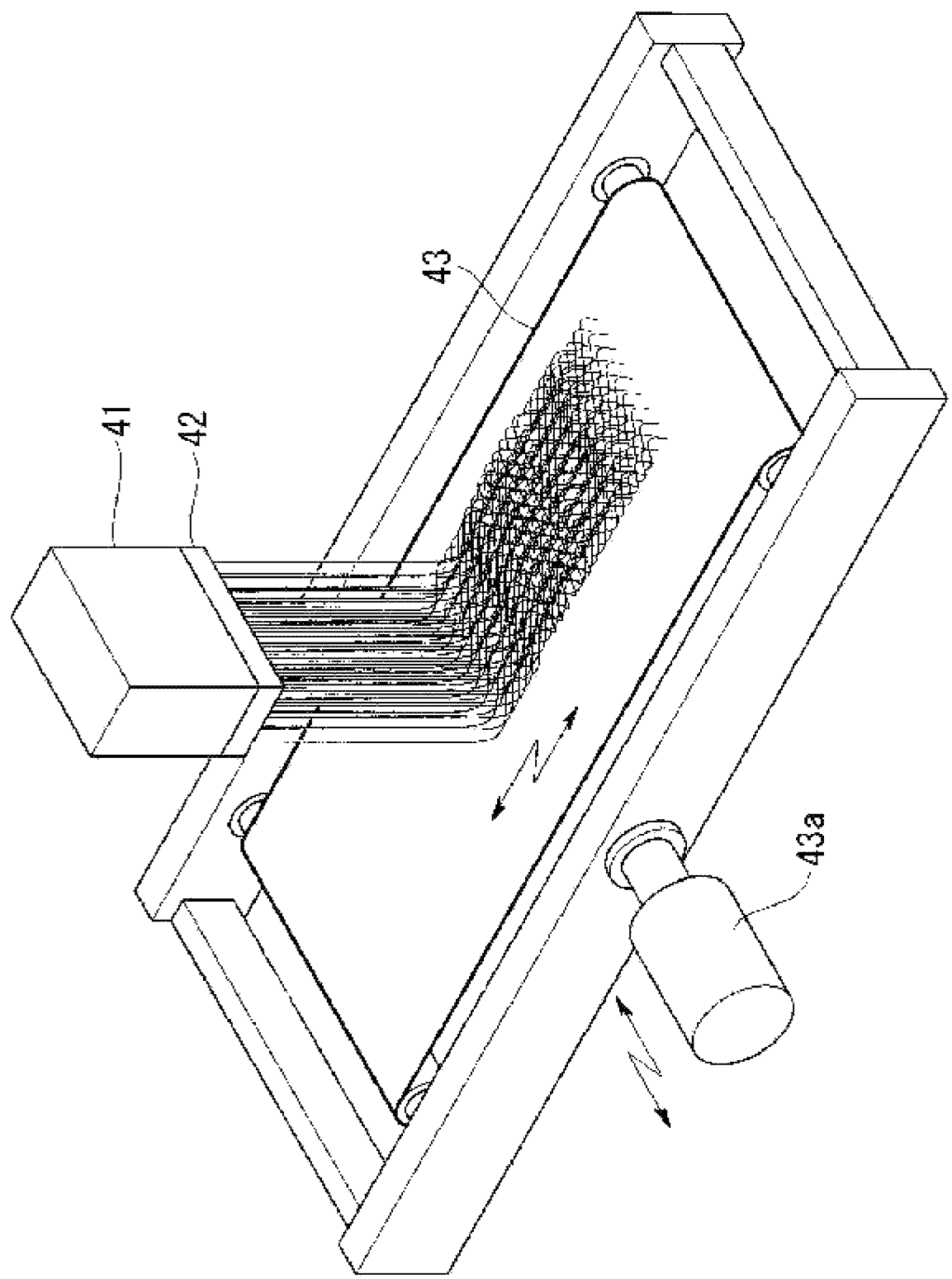
FIG. 18 is a diagram of an aluminum fiber block forming method according to a seventh transformation of a first embodiment.

Moreover, such a structure that the belt conveyor 43 used as a predetermined support surface is arranged in the container 49 shown in FIG. 12 and the aluminum fibers jetted from the nozzle 42 fall on a belt of the belt conveyor 43 may further be formed. Moreover, as shown in FIG. 18, a vibration application mechanism 43a which makes the belt conveyor 43 vibrate in the horizontal direction orthogonal to its conveying direction may be arranged. The vibration application mechanism 43a is a mechanism which applies vibration with an amplitude of, for example, several mm to several cm to the belt conveyor 43. Under such a condition, in a state that the belt conveyor 43 vibrates through the vibration application mechanism 43a, the belt conveyor 43 conveys the aluminum fibers in its conveying direction. Preferably, a vibration frequency is 0.1 Hz~several Hz. Therefore, as shown in FIG. 18, a number of contacts between adjacent aluminum fibers is increased, which is favorable for reducing the movement resistance of the electrons between the active substance powder or the adsorbent powder and the input/output terminals and increases the thickness of the formed aluminum fiber block when the belt conveyor 43 reciprocally moves in the conveying direction. In addition, as shown in FIG. 11~FIG. 12, when the aluminum fibers are jetted downwards, according to different conditions, even though the short fiber removing procedure is not performed, a number of the short fibers in the aluminum nonwoven fiber material may also be reduced.

An electrode according to a second embodiment of the disclosure will be described below with reference to the drawings.

The electrode uses an aluminum nonwoven fiber material with different sectional shapes of fibers instead of the aluminum nonwoven fiber material 10 of the first embodiment, and other structures are the same as the first embodiment, and thus will not be described anymore.

Figure 13:
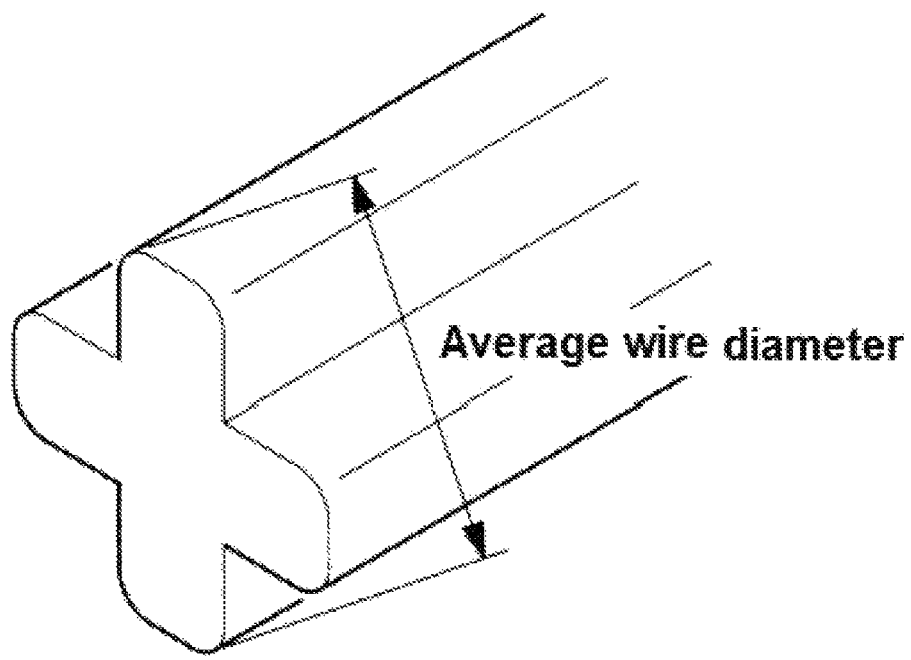
FIG. 13 is a sectional view of an aluminum fiber involved in a second embodiment of the disclosure.
Figure 14:
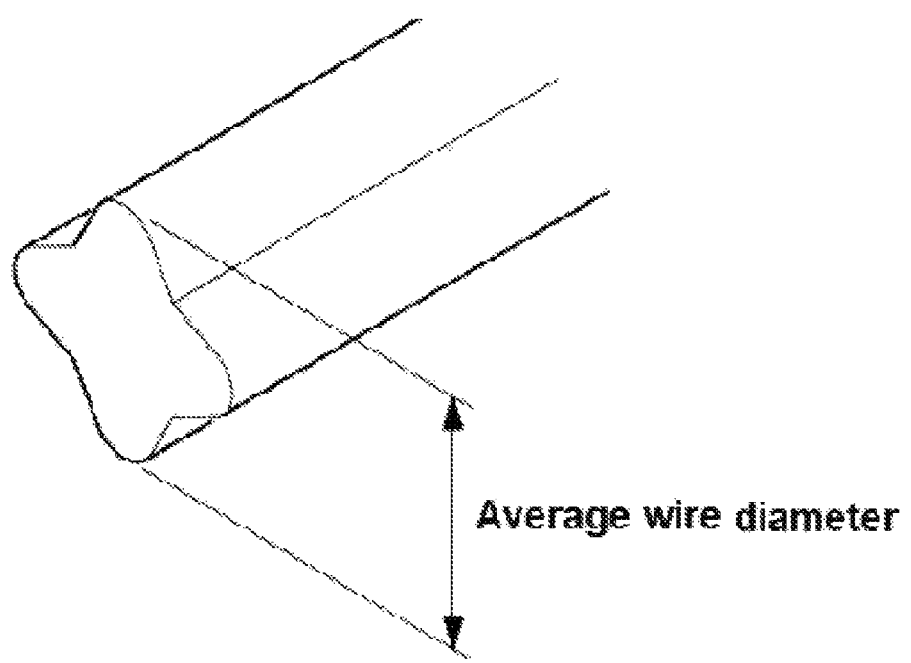
FIG. 14 is a sectional view of an aluminum fiber involved in a transformation of a second embodiment of the disclosure.

An average wire diameter of the aluminum fibers of the aluminum nonwoven fiber material of the embodiment is smaller than 100 μm, and as shown in FIG. 13, FIG. 14 and the like, the sectional shapes are not round. As shown in FIG. 13 and FIG. 14, the average wire diameter at this moment is measured at a position where a size is maximized.

In the embodiment, as shown in FIG. 13 and FIG. 14, the sectional shape of each aluminum fiber has more than three convexly-shaped parts and more than three concavely-shaped parts, the convexly-shaped parts have inner angles of smaller than 180°, and the concavely-shaped parts are arranged between every two convexly-shaped parts respectively, and have inner angles of larger than 180°, wherein the inner angle refers to an angle formed by two sides of the convexly-shaped part or the concavely-shaped part, and is an angle existing in a section.

Under such a condition, when the adsorbent powder or the active substance powder is arranged in the concavely-shaped parts of each aluminum fiber, it is difficult for the adsorbent powder or the active substance powder to move relative to each aluminum fiber in the aluminum nonwoven fiber material, which is favorable for keeping contact between the adsorbent powder or the active substance powder and each aluminum fiber for a long time.

As mentioned above, a double electric layer capacitor or lithium battery which is low in cost and internal resistance and has high charging/discharging performance may be manufactured by using the aluminum fibers as the current collector. Moreover, in the aluminum fibers used as the current collector, particularly in the aluminum fibers of which the sectional shapes are the shapes shown in FIG. 13, FIG. 14 and the like, the active substance powder, the adsorbent powder, the conductive agent, the binder and the like are closely attached to the fibers by pressing, and are unlikely to be detached, so that the phenomenon of characteristic deterioration of stripping from the current collector and the like caused by expansion, shrinkage or the like of the volume of the active substance powder during charging/discharging of an electrode of, for example, a lithium ion secondary battery may be prevented.

REFERENCE SIGNS IN THE ACCOMPANYING DRAWINGS

10: aluminum nonwoven fiber material; 20: active substance powder; 30: conductive agent; 40: sealed container; 41: curved pipe; 42: nozzle; 43: belt conveyor; 44: plate; and 45: exciter.

What is claimed is:
1. A manufacturing method for an aluminum nonwoven fiber material for a current collector of electric power storage equipment, comprising:
 a block forming procedure, extruding molten aluminum into a space through micropores and, moreover, making aluminum fibers formed by extrusion fall on a predetermined support surface, thereby forming an aluminum fiber block on the support surface; and
 a short fiber removing procedure, performing removing treatment on aluminum short fibers shorter than a predetermined length from the aluminum fiber block, thereby treating the aluminum fiber block into the aluminum nonwoven fiber material for the current collector.
2. The manufacturing method for the aluminum nonwoven fiber material as claimed in claim 1, wherein,
 in the removing treatment, applying vibration to the aluminum fiber block to remove the aluminum short fibers.
3. The manufacturing method for the aluminum nonwoven fiber material as claimed in claim 1, wherein,
 in the block forming procedure, applying a force in an extrusion direction of the aluminum fibers to the aluminum fibers formed by extrusion through an air blower or a force application mechanism before they fall on the predetermined support surface.
4. The manufacturing method for the aluminum nonwoven fiber material as claimed in claim 1, wherein
 performing a pressure reduction procedure of turning the space into negative pressure before the block forming procedure.
5. The manufacturing method for the aluminum nonwoven fiber material as claimed in claim 1, wherein,
 in the block forming procedure, extruding the aluminum downwards to form the aluminum fibers through the micropores, and moreover, making the formed aluminum fibers fall on the support surface in a state of simultaneously moving the support surface towards a predetermined conveying direction and applying vibration in a direction orthogonal to the conveying direction to the support surface, thereby forming the aluminum fiber block on the support surface.
6. The manufacturing method for the aluminum nonwoven fiber material as claimed in claim 2, wherein,
 purity of the aluminum is over 99.9%.
7. A manufacturing method for an electrode of electric power storage equipment, comprising:
 a slurry manufacturing procedure, manufacturing liquiform or gelatinous slurry containing adsorbent powder adsorbed by electrolyte ions during charging or active substance powder which undergoes chemical reaction during charging/discharging and a binder;

a import procedure, importing the slurry into an aluminum nonwoven fiber material manufactured by the manufacturing method as claimed in claim 2; and a drying procedure, drying the slurry attached to the aluminum nonwoven fiber material after the import procedure.

8. A manufacturing method for the electrode as claimed in claim 7, further comprising:

a lamination procedure between the import procedure and the drying procedure, laminating multiple aluminum nonwoven fiber materials with the slurry imported in the import procedure.

9. The manufacturing method for the electrode as claimed in claim 7, after the import procedure or the drying procedure, further comprising:

a pressurization procedure, pressurizing the aluminum nonwoven fiber material.

10. The manufacturing method for the electrode as claimed in claim 7, wherein, in the slurry procedure, manufacturing the slurry containing the adsorbent powder or the active substance powder and carbon fibers with an average diameter smaller than 0.5 μm.

11. The manufacturing method for the aluminum nonwoven fiber material as claimed in claim 1, further comprising a pressurization procedure after the short fiber removing procedure, and the pressurization procedure comprising pressurizing the aluminum fiber block subjected to the short fiber removing procedure to form the aluminum nonwoven fiber material.

\* \* \* \* \*